(12) United States Patent
Chae et al.

(10) Patent No.: US 7,366,225 B2
(45) Date of Patent: Apr. 29, 2008

(54) APPARATUS AND METHOD FOR RECEIVING DATA IN A MOBILE COMMUNICATION SYSTEM USING AN ADAPTIVE ANTENNA ARRAY TECHNIQUE

(75) Inventors: Chan-Byoung Chae, Seoul (KR); Chang-Ho Suh, Seoul (KR); Dong-Seek Park, Yongin-si (KR); Young-Kwon Cho, Suwon-si (KR); Byoung-Yun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 650 days.

(21) Appl. No.: 10/881,977

(22) Filed: Jun. 30, 2004

(65) Prior Publication Data

US 2004/0264558 A1    Dec. 30, 2004

(30) Foreign Application Priority Data

Jun. 30, 2003    (KR) ............... 2003-43849

(51) Int. Cl.
H04B 1/00    (2006.01)

(52) U.S. Cl. ............ 375/136; 375/144; 375/147; 375/148; 375/150; 375/136

(58) Field of Classification Search ........ 375/130, 375/144, 141, 147, 148, 267, 347, 349
See application file for complete search history.

(56) References Cited

U.S. PATENT DOCUMENTS

| | | | |
|---|---|---|---|
| 5,598,428 A | 1/1997 | Sato | |
| 6,177,906 B1 * | 1/2001 | Petrus | 342/378 |
| 6,205,166 B1 | 3/2001 | Maruta et al. | |
| 6,353,643 B1 | 3/2002 | Park | |
| 6,404,803 B1 | 6/2002 | Wang et al. | |
| 6,882,681 B2 * | 4/2005 | Sano | 375/148 |
| 7,170,924 B2 * | 1/2007 | Corbaton et al. | 375/148 |
| 2002/0054621 A1 * | 5/2002 | Kyeong et al. | 375/147 |
| 2003/0086366 A1 * | 5/2003 | Branlund et al. | 370/208 |

FOREIGN PATENT DOCUMENTS

EP    0 667 686    8/1995

* cited by examiner

*Primary Examiner*—Shuwang Liu
*Assistant Examiner*—Kabir A Timory
(74) *Attorney, Agent, or Firm*—The Farrell Law Firm, PC

(57) ABSTRACT

A mobile communication system receives a reception signal of a reception signal, and performs a control operation such that a weight for generating a reception beam is calculated using a first technique if a difference between an error sum value at a current time and an error sum value at a previous time is greater than an absolute value of a first threshold or the error sum value at the current time is greater than or equal to a second threshold, and performs a control operation such that the weight is calculated using a second technique if the different between the error sum value at the current time and the error sum value at the previous time is less than or equal to the absolute value of the first threshold and the error sum value at the current time is less than the second threshold.

30 Claims, 10 Drawing Sheets

APPARATUS AND METHOD FOR RECEIVING DATA IN A MOBILE COMMUNICATION SYSTEM USING AN ADAPTIVE ANTENNA ARRAY TECHNIQUE

PRIORITY

This application claims priority under 35 U.S.C. § 119 to an application entitled "Apparatus and Method for Receiving Data in a Mobile Communication System Using an Adaptive Antenna Array" filed in the Korean Intellectual Property Office on Jun. 30, 2003 and assigned Serial No. 2003-43849, the contents of which are incorporated herein by reference.

BACKGROUND OF THE INVENTION

1. Field of the Invention

The present invention relates generally to an apparatus and method for receiving data in a mobile communication system using an Adaptive Antenna Array (AAA) technique, and in particular, to an apparatus and method for receiving data using a 2-step weight generation technique.

2. Description of the Related Art

A next generation mobile communication system has evolved into a packet service communication system that transmits burst packet data to a plurality of mobile stations (MSs). The packet service communication system has been designed to be suitable for the transmission of mass data. Such a packet service communication system has been developing for high-speed packet service. In this regard, the $3^{rd}$ Generation Partnership Project (3GPP), a standardization organization for asynchronous communication technique, proposes a High Speed Downlink Packet Access (HSDPA) to provide the high-speed packet service, while the $3^{rd}$ Generation Partnership Project 2 (3GPP2), a standardization organization for synchronous communication technique, proposes a 1× Evolution Data Only/Voice (1× EV-DO/V) to provide the high-speed packet service. Both HSDPA and 1× EV-DO/V propose to provide high-speed packet service for smooth transmission of Web/Internet service, and in order to provide the high-speed packet service, a peak throughput as an well as average throughput should be optimized for smooth transmission of the packet data as well as the circuit data such as voice service data.

In order to support the high-speed transmission of packet data, a communication system employing the HSDPA (hereinafter referred to as an "HSDPA communication system") has newly introduced 3 kinds of data transmission techniques: an Adaptive Modulation and Coding (AMC) technique, a Hybrid Automatic Retransmission Request (HARQ) technique, and a Fast Cell Selection (FCS) technique. The HSDPA communication system increases a data rate using the AMC, HARQ and FCS techniques. As another communication system for increasing a data rate, there is a communication system using the 1× EV-DO/V (hereinafter referred to as a "1× EV-DO/V communication system"). The 1× EV-DO/V communication system also increases a data rate to secure system performance. Aside from the new techniques such as AMC, HARQ and FCS, there is a Multiple Antenna technique as another technique for coping with the limitation in assigned bandwidth, i.e. increasing a data rate. The Multiple Antenna technique can overcome the limitation of bandwidth resource in a frequency domain because it utilizes a space domain.

The Multiple Antenna technique will be described herein below. A communication system is constructed such that a plurality of MSs communicate with each other via one base station (BS). When the BS performs a high-speed data transmission to the MSs, a fading phenomenon occurs due to a characteristic of radio channels. In order to overcome the fading phenomenon, a Transmit Antenna Diversity technique, a kind of the Multiple Antenna technique, has been proposed. The Transmit Antenna Diversity refers to a technique for transmitting signals using at least two transmission antennas, i.e. multiple antennas, to minimize a loss of transmission data due to a fading phenomenon, thereby increasing a data rate. The Transmit Antenna Diversity will be described herein below.

Generally, in a wireless channel environment in a mobile communication system, unlike in a wired channel environment, a transmission signal is actually distorted due to several factors such as multipath interference, shadowing, wave attenuation, time-varying noise, interference, etc. Fading caused by the multipath interference is closely related to the mobility of a reflector or a user (or aMS), and actually, a mixture of a transmission signal and an interference signal is received. Therefore, the received signal suffers from severe distortion during its actual transmission, reducing performance of the entire mobile communication system. The fading may result in the distortion in the amplitude and the phase of the received signal, preventing high-speed data communication in the wireless channel environment. Many studies are being conducted in order to resolve the fading. In conclusion, in order to transmit data at a high speed, the mobile communication system must minimize a loss due to a characteristic of a mobile communication channel such as fading, and interference of an individual user. As a technique for preventing unstable communication due to the fading, a diversity technique is used, and multiple antennas are used to implement a Space Diversity technique, one type of the diversity technique.

The Transmit Antenna Diversity is popularly used as a technique for efficiently resolving the fading phenomenon. The Transmit Antenna Diversity receives a plurality of transmission signals that have experienced an independent fading phenomena in a wireless channel environment, thereby coping with distortion caused by the fading. The Transmit Antenna Diversity is classified into Time Diversity, Frequency Diversity, Multipath Diversity, and Space Diversity. In other words, a mobile communication system must cope well with the fading phenomenon that severely affects communication performance, in order to perform the high-speed data communication. The fading phenomenon must be overcome because it reduces the amplitude of a received signal up to several dB to tens of dB. In order to overcome the fading phenomenon, the above diversity techniques are used. For example, Code Division Multiple Access (CDMA) technique adopts a Rake receiver that can achieve diversity performance using a delay spread of the channel. The Rake receiver is a kind of a Receive Diversity technique for receiving multipath signals. However, the Receive Diversity used in the Rake receiver is disadvantageous in that it cannot achieve a desired diversity gain when the delay spread of the channel is relatively small.

The Time Diversity technique efficiently copes with burst errors occurring in a wireless channel environment using interleaving and coding, and is generally used in a Doppler spread channel. Disadvantageously, however, the Time Diversity can hardly obtain the diversity effects in a low-speed Doppler spread channel. The Space Diversity technique is generally used in a channel with a low delay spread such as an indoor channel and a pedestrian channel which is a low-speed Doppler spread channel. The Space Diversity is a technique for achieving a diversity gain using at least two antennas. In this technique, when a signal transmitted via one antenna is attenuated due to fading, a signal transmitted via another antenna is received, thereby acquiring a diversity gain. The Space Diversity is classified into Receive Antenna Diversity using a plurality of reception antennas and Transmit Antenna Diversity using a plurality of transmission antennas.

A Receive-Adaptive Antenna Array (Rx-AAA) technique, a kind of the Receive Antenna Diversity technique, will be described herein below.

In the Rx-AAA technique, by calculating a scalar product of an appropriate weight vector and a signal vector of a reception signal received via an antenna array comprised of a plurality of reception antennas, a signal received in a direction desired by a receiver is maximized in its level and a signal received in a direction not desired by the receiver is minimized in its level. As a result, the Rx-AAA technique amplifies only a desired reception signal to a maximum level thereby maintaining a high-quality call and causing an increase in the entire system capacity and service coverage.

Although the Rx-AAA technique can be applied to both a Frequency Division Multiple Access (FDMA) mobile communication system and a Time Division Multiple Access (TDMA) mobile communication system, it will be assumed herein that the Rx-AAA technique is applied to a communication system using CDMA techniques (hereinafter referred to as a "CDMA communication system").

FIG. 1 is a block diagram illustrating a structure of a BS receiver in a conventional CDMA mobile communication system. Referring to FIG. 1, the BS receiver is comprised of N reception antennas (Rx_ANT) of a first reception antenna 111, a second reception antenna 121, . . . , and an $N^{th}$ reception antenna 131, N radio frequency (RF) processors of a first RF processor 112, a second RF processor 122, . . . , and an $N^{th}$ RF processor 132, being mapped to the corresponding reception antennas, N multipath searchers of a first multipath searcher 113, a second multipath searcher 123, . . . , and an $N^{th}$ multipath searcher 133, being mapped to the corresponding RF processors, L fingers of a first finger 140-1, a second finger 140-2, . . . , and an $L^{th}$ finger 140-L, for processing L multipath signals searched by the multipath searchers, a multipath combiner 150 for combining multipath signals output from the L fingers, a deinterleaver 160, and a decoder 170.

Signals transmitted by transmitters in a plurality of MSs are received at the N reception antennas over a multipath fading radio channel. The first reception antenna 111 outputs the received signal to the first RF processor 112. Each of the RF processors is comprised of an amplifier, a frequency converter, a filter, and an analog-to-digital (A/D) converter, and processes an RF signal. The first RF processor 112 RF-processes a signal output from the first reception antenna 111 to convert the signal into a baseband digital signal, and outputs the baseband digital signal to the first multipath searcher 113. The first multipath searcher 113 separates L multipath components from a signal output from the first RF processor 112, and the separated L multipath components are output to the first finger 140-1 to the $L^{th}$ finger 140-L, respectively.

The first finger 140-1 to the $L^{th}$ finger 140-L, being mapped to the L multiple paths on a one-to-one basis, process the L multipath components. Because the L multiple paths are considered for each of the signals received via the N reception antennas, signal processing must be performed on N×L signals, and among the N×L signals, signals on the same path are output to the same finger.

Similarly, the second reception antenna 121 outputs the received signal to the second RF processor 122. The second RF processor 122 RF-processes a signal output from the second reception antenna 121 to convert the signal into a baseband digital signal, and outputs the baseband digital signal to the second multipath searcher 123. The second multipath searcher 123 separates L multipath components from a signal output from the second RF processor 122, and the separated L multipath components are output to the first finger 140-1 to the $L^{th}$ finger 140-L, respectively.

In this same manner, the $N^{th}$ reception antenna 131 outputs the received signal to the $N^{th}$ RF processor 132. The $N^{th}$ RF processor 132 RF-processes a signal output from the $N^{th}$ reception antenna 131 to convert the signal into a baseband digital signal, and outputs the baseband digital signal to the $N^{th}$ multipath searcher 133. The N th multipath searcher 133 separates L multipath components from a signal output from the $N^{th}$ RF processor 132, and the separated L multipath components are output to the first finger 140-1 to the $L^{th}$ finger 140-L, respectively.

In this way, among the L multipath signals for the signals received via the N reception antennas, the same multipath signals are input to the same fingers. For example, first multipath signals from the first reception antenna 111 to the $N^{th}$ reception antenna 131 are input to the first finger 140-1. In the same manner, $L^{th}$ multipath signals from the first reception antenna 111 to the $N^{th}$ reception antenna 131 are input to the $L^{th}$ finger 140-L. The first finger 140-1 to the $L^{th}$ finger 140-L are different only in signals input thereto and output therefrom, and are identical in structure and operation. Therefore, only the first finger 140-1 will be described for simplicity.

The first finger 140-1 is comprised of N despreaders of a first despreader 141, a second despreader 142, . . . , and an $N^{th}$ despreader 143, being mapped to the N multipath searchers, a signal processor 144 for calculating a weight vector for generating a reception beam using signals received from the N despreaders, and a reception beam generator 145 for generating a reception beam using the weight vector calculated by the signal processor 144.

A first multipath signal output from the first multipath searcher 113 is input to the first despreader 141. The first despreader 141 despreads the first multipath signal output from the first multipath searcher 113 with a predetermined spreading code, and outputs the despread multipath signal to the signal processor 144 and the reception beam generator 145. Here, the despreading process is called "temporal processing." Similarly, a first multipath signal output from the second multipath searcher 123 is input to the second despreader 142. The second despreader 142 despreads the first multipath signal output from the second multipath searcher 123 with a predetermined spreading code, and outputs the despread multipath signal to the signal processor 144 and the reception beam generator 145. In the same way, a first multipath signal output from the $N^{th}$ multipath searcher 133 is input to the $N^{th}$ despreader 143. The $N^{th}$ despreader 143 despreads the first multipath signal output from the $N^{th}$ multipath searcher 133 with a predetermined spreading code, and outputs the despread multipath signal to the signal processor 144 and the reception beam generator 145.

The signal processor 144 receives the signals output from the first despreader 141 to the $N^{th}$ despreader 143, and calculates a weight set $W_k$ for generation of reception beam. Here, a set of first multipath signals output from the first multipath searcher 113 to the $N^{th}$ multipath searcher 133 will be defined as "$X_k$." The first multipath signal set $X_k$ represents a set of first multipath signals received via the first reception antenna 111 to the $N^{th}$ reception antenna 131 at a $k^{th}$ point, and the first multipath signals constituting the first multipath signal set $X_k$ are all vector signals. The weight set $W_k$ represents a set of weights to be applied to the first multipath signals received via the first reception antenna 111 to the $N^{th}$ reception antenna 131 at the $k^{th}$ point, and the weights constituting the weight set $W_k$ are all vector signals.

A set of signals determined by despreading all of the first multipath signals in the first multipath signal set $X_k$ will be defined as $y_k$. The despread signal set $y_k$ of the first multipath signals represents a set of signals determined by despreading the first multipath signals received via the first reception antenna 111 to the $N^{th}$ reception antenna 131 at the $k^{th}$ point, and the despread signals constituting despread signal set $y_k$ of the first multipath signals are all vector signals. Here, for the convenience of explanation, the term "set" will be omitted, and the underlined parameters represent sets of corresponding elements.

Each of the first despreaders 141 to the $N^{th}$ despreaders 143 despreads the first multipath signal $X_k$ with a predetermined despreading code, so that the reception power of a desired reception signal is greater than the reception power of an interference signal by a process gain. Here, the despreading code is identical to the spreading code used in the transmitters of the MSs.

As described above, the despread signal $y_k$ of the first multipath signal $X_k$ is input to the signal processor 144. The signal processor 144 calculates a weight $W_k$ with the despread signal $y_k$ of the first multipath signal $X_k$, and outputs the weight $W_k$ to the reception beam generator 145. As a result, the signal processor 144 calculates the weight $W_k$ including a total of N weight vectors applied to the first multipath signal $X_k$ output from the first reception antenna 111 to the $N^{th}$ reception antenna 131, with the despread signals $y_k$ of a total of N first multipath signals output from the first reception antenna 111 to the $N^{th}$ reception antenna 131. The reception beam generator 145 receives the despread signals $y_k$ of a total of the N first multipath signals $X_k$ and a total of the N weight vectors $W_k$. The reception beam generator 145 generates a reception beam with a total of the N weight vectors $W_k$, calculates a scalar product of the despread signal $y_k$ of the first multipath signal $X_k$ and the weight $W_k$ corresponding to the reception beam, and outputs the result as an output $z_k$ of the first finger 140-1. The output $z_k$ of the first finger 140-1 can be expressed as $$z_k = w_k^H y_k \quad (1)$$

In Equation (1), H denotes a Hermitian operator, i.e. a conjugate-transpose. A set $z_k$ of output signals $z_k$ from L fingers in the BS receiver is finally input to the multipath combiner 150.

Although only the first finger 140-1 has been described, the other fingers are also equal to the first finger 140-1 in operation. Therefore, the multipath combiner 150 combines the signals output from the first finger 140-1 to the $L^{th}$ finger 140-L, and outputs the combined signal to the deinterleaver 160. The deinterleaver 160 deinterleaves the signal output from the multipath combiner 150 in a deinterleaving method corresponding to the interleaving method used in the transmitter, and outputs the deinterleaved signal to the decoder 170. The decoder 170 decodes the signal output from the deinterleaver 160 in a decoding method corresponding to the encoding method used in the transmitter, and outputs the decoded signal as final reception data.

The signal processor 144 calculates a weight $W_k$ such that a Mean Square Error (MSE) of a signal received from a MS transmitter, desired to be received by a predetermined algorithm, becomes minimized. The reception beam generator 145 generates a reception beam using the weight $W_k$ generated by the signal processor 144, and the process of generating a reception beam so that MSE becomes minimized is called "spatial processing." Therefore, when the Rx-AAA technique is used in a CDMA mobile communication system, temporal processing and spatial processing are simultaneously performed. The operation of simultaneously performing temporal processing and spatial processing is called "spatial-temporal processing."

The signal processor 144 receives multipath signals despread for each finger in the above-stated manner, and calculates a weight capable of maximizing a gain of the Rx-AAA technique according to a predetermined algorithm. The signal processor 144 minimizes the MSE. Therefore, a recent study is actively conducted on a weight calculation algorithm for adaptively minimizing the MSE. However, the weight calculation algorithm for adaptively minimizing the MSE is an algorithm for reducing errors on the basis of a reference signal, and this algorithm supports a Consultant Modulus (CM) technique and a Decision-Directed (DD) technique as a blind technique, when there is no reference signal.

However, the algorithm for reducing errors on the basis of a reference signal is hard to converge into a minimum MSE value desired by the system in an environment where a channel such as a fast fading channel suffers from a rapid change, or an environment where a high-order modulation scheme such as 16-ary quadrature amplitude modulation (16 QAM) is used. Even though it converges into a particular MSE value, the minimum MSE value is set to a relatively large value. When the minimum MSE value is set to a relatively large value, a gain occurring by the use of the Rx-AAA technique is reduced. Therefore, this algorithm is not suitable for a high-speed data communication system.

SUMMARY OF THE INVENTION

It is, therefore, an object of the present invention to provide an apparatus and a method for receiving data using an Adaptive Antenna Array technique in a mobile communication system.

It is another object of the present invention to provide an apparatus and a method for receiving data using a 2-step weight generation technique in a mobile communication system using an Adaptive Antenna Array technique.

It is further another object of the present invention to provide an apparatus and a method for generating a reception beam having a minimum error value in a mobile communication system using an Adaptive Antenna Array technique.

In accordance with a first aspect of the present invention, there is provided an apparatus to generate a weight for generating a reception beam, in a signal reception apparatus, the apparatus comprising. The apparatus includes a signal processor to receive a reception signal, an output signal generated by using the reception signal and the generated reception beam, and the weight, calculate the weight using a first technique if a difference between an error sum value at a current time and an error sum value at a previous time is greater than an absolute value of a first threshold or the error sum value at the current time is greater than or equal to a second threshold, and calculate the weight using a second technique if the different between the error value at the current time and the error sum value at the previous time is less than or equal to the absolute value of the first threshold and the error sum value at the current time is less than the second threshold; wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or is different from the third timing point.

In accordance with a second aspect of the present invention, there is provided an apparatus to generate a weight for generating a reception beam in a signal reception apparatus. The apparatus includes a weight calculator to receive a reception signal and calculate the weight using one of a first technique and a second technique under a predetermined control; a convergence determiner to allow the weight calculator to use the first technique if a difference between an error sum value at a current time and an error sum value at a previous time is greater than an absolute value of a first threshold or the error sum value at the current time is greater than or equal to a second threshold, and allowing the weight calculator to use the second technique if the difference between the error sum value at the current time and the error sum value at the previous time is less than or equal to the absolute value of the first threshold and the error sum value at the current time is less than the second threshold; and a reception beam generator to receive the reception signal, generate a reception beam using the calculated weight, and generate an output signal by using the reception signal and the reception beam; wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or is different from the third timing point.

In accordance with a third aspect of the present invention, there is provided an apparatus to generate a weight for generating a reception beam in a signal reception apparatus. The apparatus includes a reception correlation calculator to calculate reception correlation matrixes using a desired reception signal and a reception signal; a weight calculator to receive the reception signal and calculate the weight using one of a first technique and a second technique under a predetermined control; a convergence determiner to allow the weight calculator to use the first technique if a difference between an error sum value at a current time, representative of a difference between an output signal generated by using the reception signal, the reception beam, a desired reception signal, and an error sum value at a previous time is greater than an absolute value of a first threshold or the error sum value at the current time is greater than or equal to a second threshold, and allowing the weight calculator to use the second technique if the difference between the error sum value at the current time and the error sum value at the previous time is less than or equal to the absolute value of the first threshold and the error sum value at the current time is less than the second threshold; and a reception beam generator to receive the reception signal, generate a reception beam using the calculated weight, and generate an output signal by using the reception signal and the reception beam; wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or is different from the third timing point.

In accordance with a fourth aspect of the present invention, there is provided an apparatus to generate a reception beam signal in a signal reception apparatus. The apparatus includes a reception beam generator to generate a reception beam signal by receiving a reception signal and a weight signal; and a signal processor for generating the reception beam signal using a first technique if a difference between an error sum value of a current weight signal generated according to a reception signal corresponding to the number of iterations at a current time and an error sum value of a previous weight signal generated according to a reception signal corresponding to the number of iterations at a previous time is greater than an absolute value of a first threshold, or if the error sum value of the current weight signal is greater than or equal to a second threshold, and generating the reception beam signal using a second technique if the difference between the error sum value of the current weight signal and the error sum value of the previous weight signal is less than or equal to the absolute value of the first threshold and the error sum value of the current weight signal is less than the second threshold; wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or is different from the third timing point.

In accordance with a fifth aspect of the present invention, there is provided a method to generate a weight for generating a reception beam in a signal reception apparatus. The method includes calculating the weight for generating the reception beam based on a reception signal, an output signal generated by using the reception signal, the reception beam, and the weight, using a predetermined technique; performing a control operation such that the weight is calculated using a first technique if a difference between an error sum value at a current time and an error sum value at a previous time is greater than an absolute value of a first threshold or the error sum value at the current time is greater than or equal to a second threshold; and performing a control operation such that the weight is calculated using a second technique if the different between the error sum value at the current time and the error sum value at the previous time is less than or equal to the absolute value of the first threshold and the error sum value at the current time is less than the second threshold; wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or is different from the third timing point.

In accordance with a sixth aspect of the present invention, there is provided a method to generate a weight for generating a reception beam in a signal reception apparatus. The method includes generating a reception beam using the weight generated in a predetermined technique, and generating an output signal by using a reception signal and the generated reception beam; calculating a cost function for minimizing an error value representative of a difference between a desired reception signal and the output signal; performing a control operation such that the weight is calculated using a first technique if a difference between an error sum value at a current time and an error sum value at a previous time is greater than an absolute value of a first threshold or the error sum value at the current time is greater than or equal to a second threshold; and performing a control operation such that the weight is calculated using a second technique if the difference between the error sum value at the current time and the error value at the previous time is less than or equal to the absolute value of the first threshold and the error sum value at the current time is less than the second threshold; wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or is different from the third timing point.

In accordance with a seventh aspect of the present invention, there is provided a method to generate a weight for generating a reception beam in a signal reception apparatus. The method includes generating a reception beam using the weight generated in a predetermined technique, and generating an output signal by using a reception signal and the generated reception beam; calculating reception correlation matrixes using a desired reception signal and the reception signal, and calculating a cost function for minimizing an error value representative of a difference between the output signal and the desired reception signal; performing a control operation such that the weight is calculated using a first technique if a difference between an error sum value at a current time and an error sum value at a previous time is greater than an absolute value of a first threshold or the error sum value at the current time is greater than or equal to a second threshold; and performing a control operation such that the weight is calculated using a second technique if the difference between the error sum value at the current time and the error sum value at the previous time is less than or equal to the absolute value of the first threshold and the error sum value at the current time is less than the second threshold; wherein the error sum value at a previous time is sum of error values during a time interval from a first timing point to a second timing point, the error sum value at the current time is a sum of error values during a time interval from a third timing point to a fourth timing point, and the second timing point is equal to the third timing point or is different from the third timing point.

In accordance with an eighth aspect of the present invention, there is provided a method to generate a reception beam signal in a signal reception apparatus. The method includes generating a reception beam signal using a reception signal and a weight signal; and generating the reception beam signal using a first technique if a difference between an error sum value of a current weight signal generated according to a despread signal corresponding to the number of iterations at a current time and an error sum value of a previous weight signal generated according to a reception signal corresponding to the number of iterations at a previous time is greater than an absolute value of a first threshold, or if the error sum value of the current weight signal is greater than or equal to a second threshold, and generating the reception beam signal using a second technique if the difference between the error sum value of the current weight signal and the error sum value of the previous weight signal is less than or equal to the absolute value of the first threshold and the error sum value of the current weight signal is less than the second threshold; wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or is different from the third timing point.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
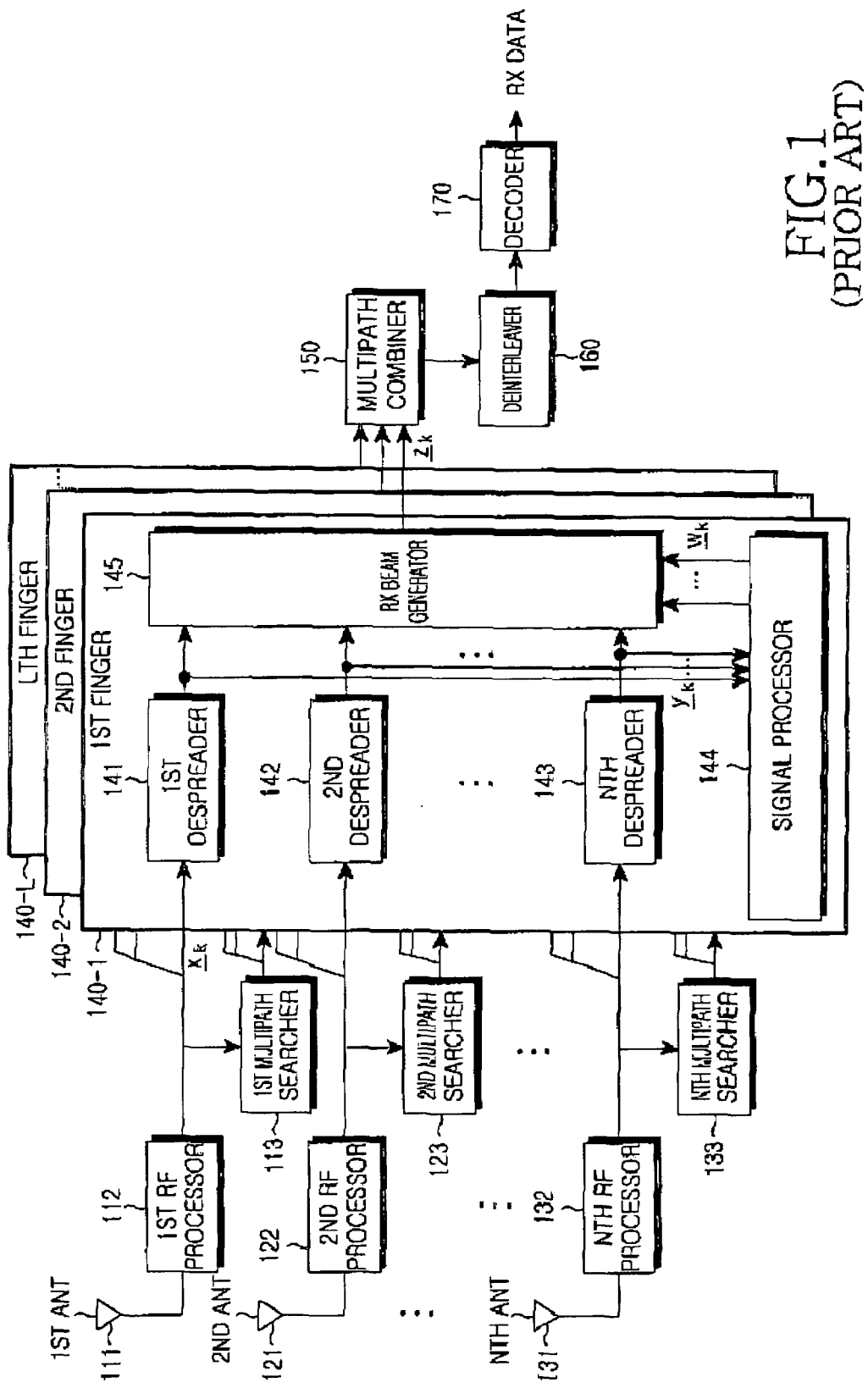
FIG. 1 is a block diagram illustrating a structure of a base station receiver in a conventional CDMA mobile communication system.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Before a description of the present invention is given, a model of a reception signal received at a receiver of a base station (BS) will be considered. It will be assumed that a receiver of the BS includes a receive-antenna array having a plurality of reception antennas (Rx ANTs), and the receive-antenna array is generally mounted only in the receiver of the BS considering its cost and size, and is not mounted in a receiver of a mobile station (MS). That is, it is assumed that the receiver of the MS includes only one reception antenna. Although the present invention can be applied to all of mobile communication systems using Frequency Division Multiple Access (FDMA), Time Division Multiple Access (TDMA), Code Division Multiple Access (CDMA) and Orthogonal Frequency Division Multiplexing (OFDM), the present invention will be described with reference to a mobile communication system using OFDM (hereinafter referred to as an "OFDM mobile communication system").

A signal transmitted from a transmitter of an $m^{th}$ MS existing in a cell serviced by the BS is expressed as $$s_m(t) = \sqrt{p_m} b_m(t) c_m(t) \tag{2}$$

In Equation (2), $s_m(t)$ denotes a transmission signal of an $m^{th}$ MS, $p_m$ denotes transmission power of the $m^{th}$ MS, $b_m(t)$ denotes a user information bit sequence of the $m^{th}$ MS, and $c_m(t)$ denotes a user spreading code sequence of the $m^{th}$ MS, having a chip period of $T_c$.

The transmission signal transmitted from the MS transmitter is received at a receiver of the BS over a multipath vector channel. It is assumed that channel parameters of the multipath vector channel are slowly changed, compared with the bit period $T_b$. Therefore, it is assumed that the channel parameters of the multipath vector channel are constant for certain bit periods. A complex baseband reception signal for a first multipath of an $m^{th}$ MS, received at a receiver of the BS, is expressed by Equation (3). It should be noted that the reception signal of Equation (3) represents a baseband signal determined by down-converting a radio frequency (RF) signal received at the BS receiver.

$$x_{ml}(t) = \alpha_{ml} e^{j\phi_{ml}} b_m(t-\tau_{ml}) c_m(t-\tau_{ml}) a_{ml} \tag{3}$$

In Equation (3), $x_{ml}$ denotes a set of complex baseband reception signals received through a first multipath of the $m^{th}$ MS, $\alpha_{ml}$, denotes a fading attenuation applied to the first multipath of the $m^{th}$ MS, $\phi_{ml}$ denotes a phase transition applied to the first multipath of the $m^{th}$ MS, $\tau_{ml}$ denotes a time delay applied to the first multipath of the $m^{th}$ MS, and $a_{ml}$ denotes a set of array responses (ARs) applied to the first multipath of the $m^{th}$ MS. Because the BS receiver includes a plurality of, for example, N reception antennas, a signal transmitted by the $m^{th}$ MS is received at the BS receiver via the N reception antennas. Therefore, the number of signals received via the first multipath is N, and N complex baseband reception signals received via the first multipath of the $m^{th}$ MS constitute a set of the reception signals. Here, for the convenience of explanation, the term "set" will be omitted, and the underlined parameters represent sets of corresponding elements.

When a current linear antenna array is used, the array response $a_{ml}$ is defined as $$a_{ml} = \begin{bmatrix} 1 & e^{j2\pi \frac{d}{\lambda} \sin\theta_{ml}} & \dots & e^{j2\pi \frac{d}{\lambda}(N-1)\sin\theta_{ml}} \end{bmatrix}^T \tag{4}$$

In Equation (4), 'd' denotes a distance between separated reception antennas, $\lambda$ denotes a wavelength at a frequency band in use, N denotes the number of the reception antennas, and $\theta_{ml}$ denotes direction-of-arrival (DOA) applied to the first multipath of the $m^{th}$ MS.

If it is assumed that the number of MSs existing in a cell serviced by the BS is M and there are L multiple paths for each of the M MSs, a reception signal received at the BS becomes the sum of transmission signals transmitted from the M MSs and additive white noise (AWN), as represented by $$x(t) = \sum_{m=1}^{M} \sum_{l=1}^{L} x_{ml}(t) + n(t) \tag{5}$$

In Equation (5), n(t) denotes the additive white noise added to the transmission signals transmitted from the M MSs.

It is assumed that a signal the BS desires to receive in the reception signal of Equation (5) is $x_{l1}$. The $x_{l1}$ represents a signal a first MS has transmitted via a first multipath. Because it is assumed that a signal the BS desires to receive is $x_{l1}$, all signals except the signal $x_{l1}$ are regarded as interference signals and noise. Thus, Equation (5) can be rewritten as $$x(t) = \alpha_{l1} e^{j\phi_{l1}} b_1(t-\tau_{l1}) c_l(t-\tau_{l1}) a_{l1} + i(t) + n(t) \tag{6}$$

In Equation (6), i(t) denotes an interference signal, which is defined as $$i(t) = \sum_{l=2}^{L} x_{1l}(t) + \sum_{m=2}^{M} \sum_{l=1}^{L} x_{ml}(t) \tag{7}$$

The first term of Equation (7) is a transmission signal of a MS that the BS desires to receive, but represents the inter-path interference (IPI) by other multiple paths that the BS does not desire to receive. The second term of Equation (7) represents the multiple access interference (MAI) by other MSs.

Further, the x(t) is despread with a despreading code $c_1(t-\tau_{l1})$ previously set in a first finger (l=1) for a corresponding multipath in a corresponding channel card of the BS receiver, i.e. a channel card (m=1) assigned to the first MS, and the despread signal y(t) is defined in Equation (8). The despreading code $c_1(t-\tau_{l1})$ is identical to the despreading code $c_1(t-\tau_{l1})$ used in a BS transmitter during signal transmission. The BS includes a plurality of receivers described in conjunction with FIG. 1, each of the receivers is called a "channel card," and one channel card is assigned to one MS. As described in connection with FIG. 1, the channel card includes as many fingers as the number of multiple paths, and the fingers are mapped to corresponding multipath signals on a one-to-one basis.

$$y(k) = \int_{(k-1)T_b + \tau_{l1}}^{kT_b + \tau_{l1}} x(t) c_1^*(t-\tau_{l1}) dt \tag{8}$$

In Equation (8), 'k' denotes a $k^{th}$ sampling point.

When the signal y(t) is generated by despreading the pre-despread signal x(t) with the despreading code $c_1(t-\tau_{l1})$, the power of a signal component the BS receiver desires to receive from among the reception signals is amplified by a gain G according to a characteristic of a despreader. It is noted that although the power of a signal component the BS receiver desires to receive is amplified by a process gain G, the power of the signal components the BS receiver does not desire to receive is not changed at all. Therefore, a correlation matrix between a reception signal before despreading and a reception signal after despreading can be calculated. In order to calculate the correlation matrix between a reception signal before despreading and a reception signal after despreading, the reception signal x(t) before despreading is sampled at a $k^{th}$ point which is equal to the sampling point of the reception signal y(t) after despreading. The signal obtained by sampling the reception signal x(t) before despreading at the $k^{th}$ point is represented by $$x(k)=\alpha_{l1}e^{j\phi_{l1}}b_{1k}c_{1k}a_{l1}+i_k+n_k \quad (9)$$

In conclusion, in order to calculate a correlation matrix between a reception signal x(t) before despreading and a reception signal y(t) after despreading, it is assumed that the signal of Equation (9) is acquired by sampling the reception signal x(t) before despreading at the $k^{th}$ point which is equal to the sampling point of the reception signal y(t) after despreading, and that the reception signal x(t) before despreading and the reception signal y(t) after despreading are stationary.

A description will now be made of a 2-step Least Mean Square (LMS) technique and a 2-step Minimum Mean Square Error (MMSE) technique.

First, the 2-step LMS technique will be described. A set of reception signals before despreading, including complex reception signals received via N reception antennas at a particular time, i.e. complex reception signals $x_1$ to $x_N$ received via a first reception antenna to an $N^{th}$ reception antenna, will be defined as $x=[x_1, x_2, \ldots, x_N]^T$. Here, 'T' is an operator representing a transpose operation. In addition, a set of reception signals after despreading the complex reception signals $x_1, x_2, \ldots, x_N$ received via the N reception antennas will be defined as $y=[y_1, y_2, \ldots, y_N]^T$. The reception signal y after despreading is determined by the sum of a signal component s the BS receiver desires to receive and a signal component u the BS receiver does not desire to receive, as represented by $$y=s+u \quad (10)$$

A set of complex weight values to be multiplied by the complex reception signals $x_1, x_2, \ldots, x_N$ received via the N reception antennas, i.e. complex weights $w_1$ to $w_N$ to be multiplied by complex reception signals $x_1$ to $x_N$ received via the first reception antenna to the $N^{th}$ reception antenna, will be defined as $w=[w_1, w_2, \ldots, w_N]^T$.

An output signal z from fingers in a particular user card, i.e. a channel card assigned to a particular MS, is determined by calculating a scalar product of the weight w and the reception signal y after despreading, as represented by $$z = \underline{w}^H \underline{y} = \sum_{i=1}^{N} w_i^* y_i \quad (11)$$

In Equation (11), 'i' denotes the number of reception antennas.

The output signal z can be classified into a signal component $w^H s$ the BS receiver desires to receive, and a signal component $w^H u$ the BS receiver does not desire to receive, using Equation (10) and Equation (11). The LMS technique minimizes errors of a known reference signal and a reception signal, and particularly, minimizes a cost function J(w) given below.

$$J(w)=(e_k)^2$$

$$e_k=d_k-z_k \quad (12)$$

In Equation (12), 'J' denotes a cost function, and a weight value w for minimizing the cost function value J must be determined. Further, in Equation (12), $e_k$ denotes a difference, or an error, between a reception signal and a desired reception signal, and $d_k$ denotes the desired signal. In a beam generation algorithm using a non-blind technique, a pilot signal is used as the desired signal $d_k$ by way of example. However, the present invention proposes a beam generation algorithm using a blind technique, so that a detailed description of the beam generation algorithm using the non-blind technique will be omitted.

In Equation (12), the cost function J is a type of a second-order convex function. Therefore, in order to minimize the cost function J, the cost function J must be differentiated so that its value becomes 0. A differentiated value of the cost function J is $$\nabla J = -2e^*_k y_k \quad (13)$$

However, it is difficult to acquire an optimal weight $w^{opt}$ in an actual channel environment in a single process, and because the reception signal y after despreading is input at each point, a recursive formula of Equation (14) should be used in order to adaptively or recursively acquire the optimal weight $w^{opt}$.

$$w_{k+1}=w_k+\mu v_k \quad (14)$$

In Equation (14), 'k' denotes a $k^{th}$ point, $w_k$ denotes a weight at the $k^{th}$ point, $\mu$ denotes a constant gain, and $v_k$ denotes a trace vector at the $k^{th}$ point. The trace vector $v^k$ at the $k^{th}$ point represents a vector for converging a differentiated value of the cost function J to a minimum value, for example, 0.

That is, Equation (14) shows a process of updating a value generated before or after a constant gain $\mu$ from a given weight $w_k$ to be used at a current point in a direction of the trace vector $v_k$ as a weight $w_{k+1}$ to be used at the next point.

In addition, in view of Mean Square (MS), Equation (14) is rewritten as $$w_{k+1}=w_k-\mu y_k e^*_k \quad (15)$$

Next, the 2-step MMSE technique will be described. The MMSE technique is a technique for minimizing errors of a reference signal and a received signal and, particularly, minimizing a cost function J(w) of Equation (16).

$$J(w)=E[|w^H y_k - d_k|^2] \quad (16)$$

In Equation (16), J denotes a cost function, and a value "w" for minimizing the cost function value J must be calculated. Because the reception signal y after despreading is input at each point as described in connection with the 2-step LMS technique, a recursive formula of Equation (17) must be used in order to adaptively or recursively acquire the optimal weight $w^{opt}$.

$$w_{k+1}=w_k+\mu v_k \quad (17)$$

As described in connection with the recursive formula for the 2-step LMS technique, i.e. the recursive formula of Equation (14), in Equation (17), 'k' denotes a $k^{th}$ point, $w_k$ denotes a weight at the $k^{th}$ point, $\mu$ denotes a constant gain, and $v_k$ denotes a trace vector at the $k^{th}$ point. That is, Equation (17) shows a process of updating a value generated before or after a constant gain $\mu$ from a given weight $w_k$ to be used at a current point in a direction of the trace vector $v_k$ as a weight $w_{k+1}$ to be used at the next point.

In addition, in view of Mean Square Error (MSE), Equation (17) is rewritten as $$\underline{w}_{k+1} = \underline{w}_k - \frac{1}{2}\mu \nabla J(\underline{w}) \quad (18)$$

In Equation (18), the cost function J is expressed as $$\nabla J(\underline{w}) = 2E[\underline{y}(k)\underline{y}^H(k)]\underline{w} - 2E[\underline{y}(k)d_n^*] \quad (19)$$
$$= 2R\underline{w} - 2P$$

In Equation (19), 'R' denotes an auto-correlation matrix $R=E[y(k)y^H(k)]$ of the reception signal, and 'P' denotes a cross-correlation $P=E[y(k)d^*(k)]$ between the reception signal and a desired reception signal.

An operation for acquiring the optimal weight $w^{opt}$ as described above acts as the most important factor for generating a reception beam. The present invention minimizes errors of a reference signal and a reception signal using the 2-step LMS technique and the 2-step MMSE technique. That is, the present invention acquires the optimal weight $w^{opt}$ by acquiring the weight w for minimizing a value of the cost function described in conjunction with Equation (12) and Equation (16). In conclusion, the present invention proposes a new technique for detecting a desired reception signal d(k) in Equation (12) and Equation (16).

The technique for detecting a desired reception signal d(k), proposed in the present invention, is called a "blind technique." Due to the use of the blind technique, a received signal should be adaptively converged using a particular estimation value, and a 2-step d(k) is used for the adaptive convergence of the received signal. The use of the 2-step d(k) means that the d(k) is acquired through a first step of a convergence step and a second step of a stabilization step.

The first step of the convergence step will now be described herein below.

First, a constant modulus (CM) technique used for adaptive convergence of the received signal will be described. The CM technique has been proposed by Godard, and is generally used in a blind equalizer and also used for a generation algorithm. When the CM technique proposed by Godard is used, the cost function J is expressed as $$J_{Godard} = E[(|z_n|^p - R_p)^2] \quad (20)$$

In Equation (20), 'p' denotes a particular positive integer, and $R_p$ denotes a Godard modulus. The Godard modulus $R_p$ is defined as $$R_p = \frac{E[|z_n|^{2p}]}{E[|z_n|^p]} \quad (21)$$

Because the current OFDM mobile communication system generally uses a high-order modulation scheme being higher in order than quadrature phase shift keying (QPSK) modulation, the cost function J is separated into a real part and an imaginary part as shown in Equation (22). The reason why the cost function J is separated into a real part and an imaginary part is because due to use of the high-order modulation scheme, transmission/reception signals have a real part and an imaginary part.

$$J = J_R + J_I \quad (22)$$
$$J_R = E[(z_{n,R}^2 - R_{2,R})^2], \quad J_I = E[(z_{n,I}^2 - R_{2,I})^2]$$

-continued
$$R_{2,R} = \frac{E[z_{n,R}^4]}{E[z_{n,R}^2]}, \quad R_{2,I} = \frac{E[z_{n,I}^4]}{E[z_{n,I}^2]}$$

It is assumed herein that the present invention uses the 2-step LMS technique and the 2-step MMSE technique, and p=2. Therefore, $d(k)=R_{2,R}+jR_{2,I}$. In addition, it is assumed that a cost function value J at an initial point, i.e. a k=0 point, is 0 (J=0). This will be described with reference to FIG. 6.

Figure 6:
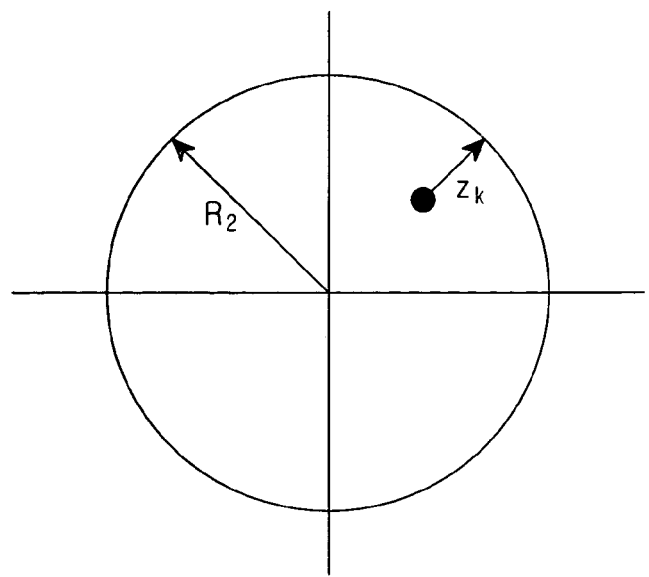
FIG. 6 is a diagram illustrating a CM technique in an OFDM mobile communication system.

FIG. 6 is a diagram illustrating a CM technique in an OFDM mobile communication system. Referring to FIG. 6, there is shown a CM technique for p=2, $d(k)=R_{2,R}+jR_{2,I}$, and J=0 at a point with k=0. That is, if a value $R_2$ is determined by Equation (22), a circle is generated on a coordinate surface. Then, a received signal is determined as a point where an extension line drawn from the origin meets the circle. In FIG. 6, received $z_k$ is projected as a circle.

The convergence step has been described so far. Next, the second step of the stabilization step for acquiring the d(k) will be described.

If MSE is converged into a predetermined value through the convergence step, a change occurs from the convergence step to the stabilization step where calculation of Equation 23 is performed. A process where a change occurs from the convergence step to the stabilization step as the MSE is converged into a predetermined value will be described later on.

$$d_R(k)=Pr[Re(z(k))]$$
$$d_I(k)=Pr[Im(z(k))] \quad (23)$$

Even in the stabilization step, like in the convergence step, a real part and an imaginary part are separately calculated. In Equation (23), Pr means that a received signal is projected as a signal most approximating the desired reception signal d(k) by a decision-directed (DD) technique. The DD technique is a technique for reflecting the d(k) as a decision value most approximating the received signal. The DD technique will now be described herein below with reference to FIG. 7.

Figure 7:
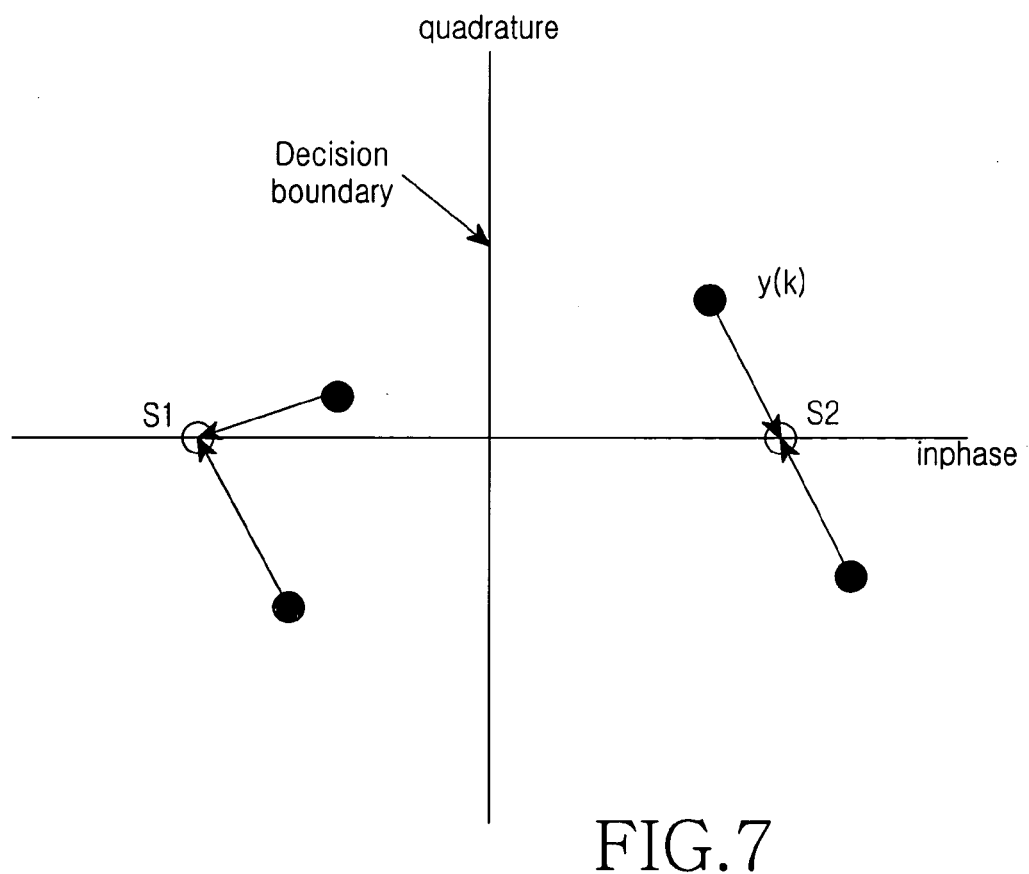
FIG. 7 is a diagram schematically illustrating a DD technique in an OFDM mobile communication system using Binary Phase Shift Keying (BPSK)

FIG. 7 is a diagram illustrating a DD technique in an OFDM mobile communication system using Binary Phase Shift Keying (BPSK). Referring to FIG. 7, because it is assumed that the OFDM mobile communication system uses BPSK, if a reception signal is (1.2, −0.2) in an I-Q domain, the desired reception signal d(k) is projected as the largest approximate value of 1 after calculating a distance from +1 and −1.

Figure 2:
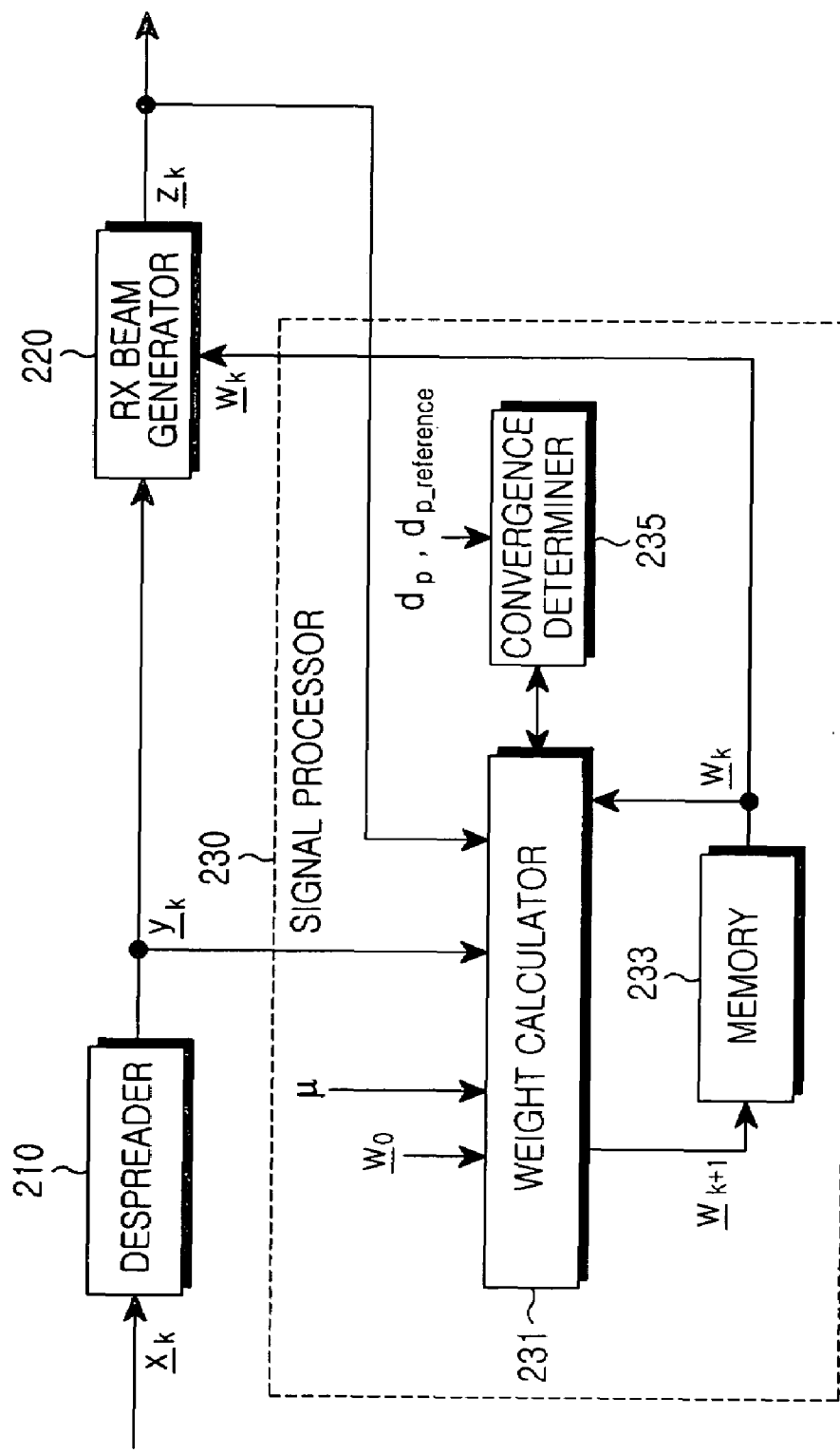
FIG. 2 is a block diagram illustrating a structure of a base station receiver according to a first embodiment of the present invention.

FIG. 2 is a block diagram illustrating a structure of a BS receiver according to a first embodiment of the present invention. While describing FIG. 2, it should be noted that a BS receiver according to the first embodiment of the present invention is similar in structure to the BS receiver described in connection with FIG. 1, but different in a method for determining a weight by a signal processor. For simplicity, only the elements directly related to the present invention in the BS receiver will be described with reference to FIG. 2. The first embodiment of the present invention corresponds to an embodiment where the LMS technique is used.

Referring to FIG. 2, when a reception signal $x_k$ at a point k is received, a despreader 210 despreads the reception signal $x_k$ using a predetermined despreading code, and outputs the despread reception signal $y_k$ to a signal processor 230 and a reception beam generator 220. The signal processor 230 is comprised of a weight calculator 231, a memory 233, and a convergence determiner 235. For simplicity, FIG. 2 will be described with reference to only the first finger 140-1 in the BS receiver of FIG. 1. Therefore, the despreader 210 of FIG. 2 is substantially identical in operation to the N despreaders of the first despreader 141 to the $N^{th}$ despreader 143 in the first finger 140-1.

The weight calculator 231 in the signal processor 230 calculates a weight $w_k$ by receiving the despread reception signal $y_k$, a predetermined constant gain μ, an initial weight $w_0$, and a finger signal $z_k$ output from the reception beam generator 220, and outputs the calculated weight to the memory 233. The memory 233 buffers the weight $w_k$ calculated by the weight calculator 231, and the weight calculator 231 uses the weight $w_k$ stored in the memory 233 when updating the weight $w_k$. That is, the weight calculator 231 updates a weight $w_{k+1}$ at the next point k+1 using the $w_k$ calculated at the point k. Meanwhile, the weight calculator 231 calculates a weight under the control of the convergence determiner 235. That is, the convergence determiner 235 determines a technique in which the weight calculator 231 will calculate a weight $w_k$. A technique for calculating the weight $w_k$ is classified into the CM technique and the DD technique. A process of selecting one of the CM technique and the DD technique by the convergence determiner 235 will be described herein below.

As described above, because the present invention uses the 2-step d(k), the two steps of a convergence step and a stabilization step are performed. The CM technique is disadvantageous in that it has a low convergence speed, and the DD technique is disadvantageous in that it has a high convergence fail rate. Therefore, the present invention performs a control operation such that the CM technique and the DD technique are used for the convergence step and the stabilization step according to their characteristics, thereby securing fast convergence into a small MSE value. Thus, a process of distinguishing the convergence step and the stabilization step acts as a very important factor in performance improvement.

The present invention uses the following method to distinguishing the convergence step and the stabilization step.

MSE at a time domain t=1, 2, 3, 4, . . . will be defined as "$S_t$." That is, the $S_t$ represents MSE of a signal received at a particular time 't'. In this case, as a reference for distinguishing the convergence step and the stabilization step, a difference between $S_t$ at a current time t=t, and $S_{t-1}$ at the next time t=t-1 will be defined as "$d_t$." The difference $d_t$ between $S_t$ and $S_{t-1}$ is defined as $$d_t = \frac{\sum_{l=1}^{l=M} |z_{M*(t-1)+l} - d_{M*(t-1)+l}|}{M} - \frac{\sum_{l=1}^{l=M} |z_{M*(t-2)+l} - d_{M*(t-2)+l}|}{M} \quad (24)$$

That is, a transition occurs from the convergence step to the stabilization step, when the $d_t$ has a value less than or equal to an absolute value of a first threshold $d_p$ (dt≦|$d_p$|). The first threshold $d_p$ is a predetermined value appropriate for the OFDM mobile communication system. In conclusion, when the difference $d_t$ between $S_t$ and $S_{t-1}$ is very small, transition occurs from the convergence step to the stabilization step.

Figure 8:
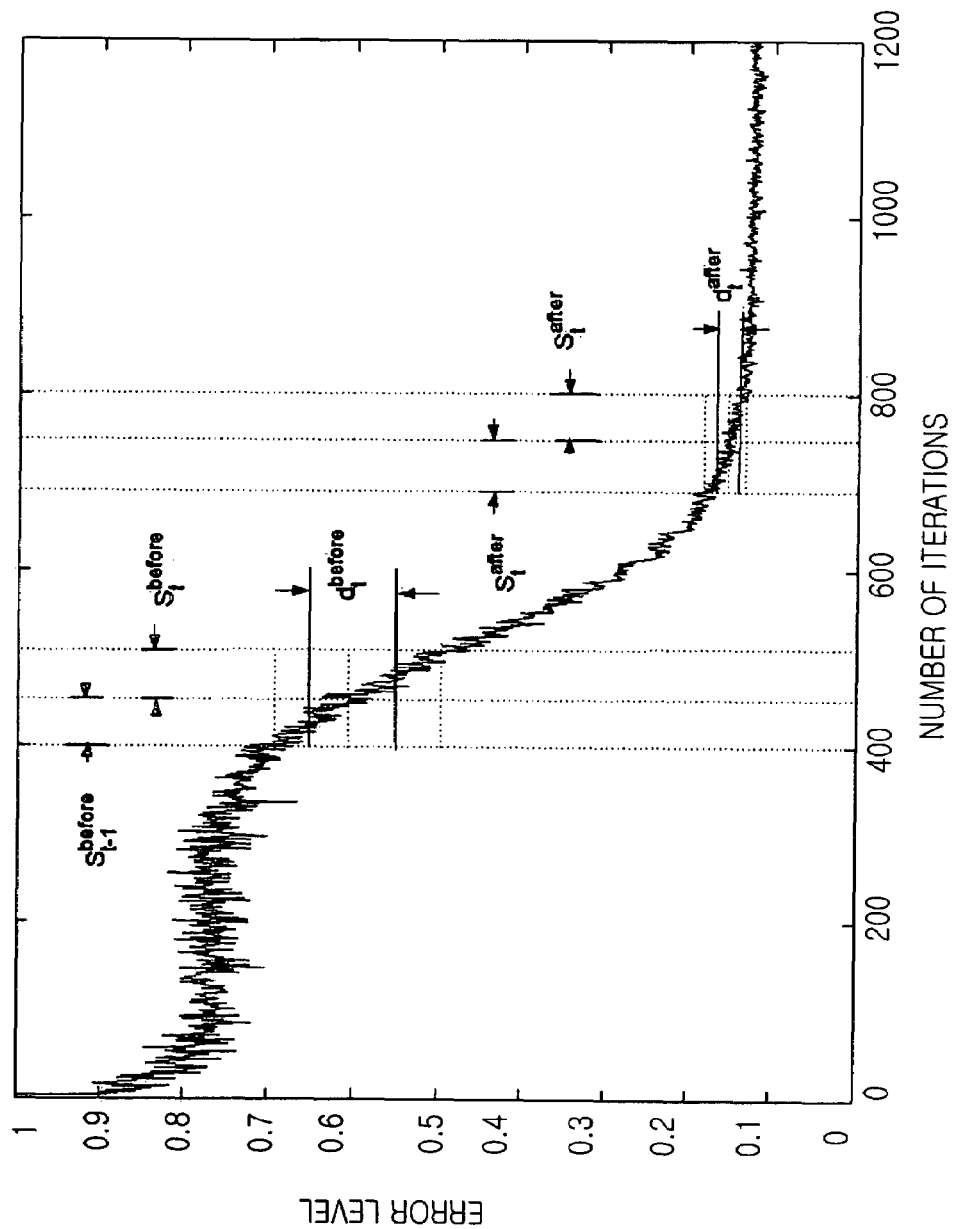
FIG. 8 is a graph illustrating a transition condition from a convergence step to a stabilization step according to an embodiment of the present invention.

FIG. 8 is a graph illustrating a transition condition from a convergence step to a stabilization step according to an embodiment of the present invention. Referring to FIG. 8, shows a difference between MSE $S_{t-1}^{before}$ of a received signal at a particular time t-1 of a previous duration and MSE $S_t^{before}$ of a received signal at a current time t of the previous duration is $d_t^{before}$, and a difference between MSE $S_{t-1}^{after}$ of a received signal at a particular time t-1 of a following duration and MSE $S_t^{after}$ of a received signal at a current time t of the following duration is $d_t^{after}$. In FIG. 8, the vertical axis represents an error level, and the horizontal axis represents the number of iterations. Therefore, the "previous duration" represents a duration with a lesser iteration number, and the "following duration" represents a duration with a greater iteration number. Because a difference $d_t^{before}$ between $S_{t-1}^{before}$ and $S_t^{before}$ of the previous duration has a value exceeding an absolute value of the first threshold $d_p$, the convergence step is maintained in the previous duration. Because a difference $d_t^{after}$ between $S_{t-1}^{after}$ and $S_t^{after}$ of the following duration has a value less than an absolute value of the first threshold $d_p$, transition occurs to the stabilization step in the following duration. However, when transition occurs to the stabilization step on the basis of only the absolute value of the first threshold $d_p$, an initial convergence domain is not distinguished. In order to distinguish the initial convergence domain a second threshold $d_{p\_reference}$ is defined, and transition occurs from the convergence step to the stabilization step when the $S_t$ has a value less than the second threshold $d_{p\_reference}$ while the $d_t$ has a value less than or equal to the absolute value of the first threshold $d_p$ ($d_t \leq |d_p|$, $S_t < d_{p\_reference}$).

In FIG. 2, using the difference $d_t$ between $S_t$ and $S_{t-1}$, the convergence determiner 235 determines if the weight calculator 231 will use the CM technique or the DD technique according to whether or not an MSE value of a received signal was converged into the first threshold $d_p$ and the $S_t$ is less than the second threshold $d_{p\_reference}$. That is, the convergence determiner 235 allows the weight calculator 231 to use the CM technique in the convergence step, and allows the weight calculator 231 to use the DD technique in the stabilization step.

Figure 3:
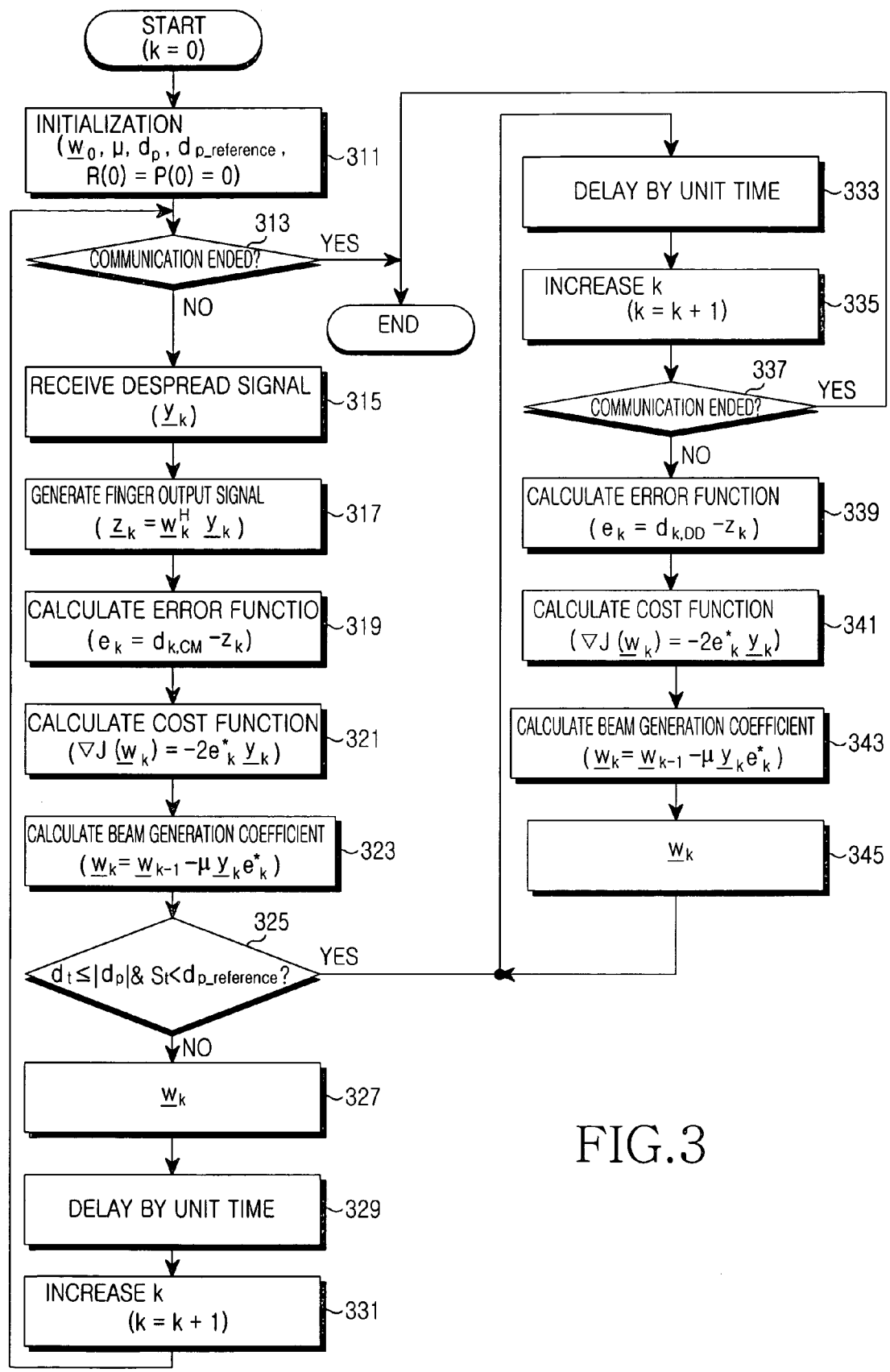
FIG. 3 is a flowchart illustrating a signal reception procedure by a base station receiver according to a first embodiment of the present invention.

FIG. 3 is a flowchart illustrating a signal reception procedure by a BS receiver according to a first embodiment of the present invention. Referring to FIG. 3, in step 311, a BS receiver sets up an initial weight $w_0$, a constant gain μ, a first threshold $d_p$, and a second threshold $d_{p\_reference}$, and sets both an initial auto-correlation matrix R(0) of a reception signal $x_k$ and an initial cross-correlation matrix P(0) between the reception signal $x_k$ and a desired reception signal $d_k$, to '0', and then proceeds to step 313. In step 313, the BS receiver determines if the communication is ended. If it is determined that the communication is ended, the BS receiver ends the ongoing procedure.

If it is determined in step 313 that the communication is not ended, the BS receiver proceeds to step 315. In step 315, the BS receiver receives a despread signal $y_k$ for the reception signal $x_k$, and then proceeds to step 317. In step 317, the BS receiver calculates a set $z_k$ of signals $z_k$ output from respective fingers of the BS receiver using the despread signal $y_k$ and a weight $w_k$ ($z_k = w_k^H y_k$), and then proceeds to step 319. The $z_k$ represents a set of finger output signals generated using a reception beam generated using the weight $w_k$. In step 319, the BS receiver calculates an error function $e_k$, and a difference between the reception signal $x_k$ and the desired reception signal $d_k$ according to the CM technique ($e_k = d_{k,CM} - z_k$) because the BS receiver is initially in the convergence step, and then proceeds to step 321.

In step 321, the BS receiver calculates a differentiated value of a cost function using the despread signal $y_k$ and the error function $e_k$ ($\nabla J(w_k)=-2e^*_k y_k$), and then proceeds to step 323. In step 323, the BS receiver calculates a beam generation coefficient, or a weight ($w_k=w_{k-1}-\mu y_k e^*_k$), and then proceeds to step 325. In step 325, the BS receiver determines if a difference $d_t$ between $S_t$ and $S_{t-1}$ satisfies a convergence condition, i.e. if the $d_t$ is less than or equal to an absolute value of the first threshold $d_p$ and the $S_t$ is less than the second threshold $d_{p\_reference}$ ($d_t \leq |d_p|$, $S_t < d_{p\_reference}$). If the $d_t$ is greater than an absolute value of the first threshold $d_p$ or the $S_t$ is greater than or equal to the second threshold $d_{p\_reference}$, the BS receiver proceeds to step 327. In step 327, the BS receiver maintains the calculated weight $w_k$, and proceeds to step 329. In step 329, the BS receiver delays by a predetermined unit time, and then proceeds to step 331. The reason for delaying by the predetermined unit time is to use a value determined at a $k^{th}$ snap for a $(k+1)^{th}$ snap, i.e. to take a state transition delay into consideration. In step 331, the BS receiver increases the k by 1, i.e. transitions from the current point k to the next point k+1, and then returns to step 313.

However, if it is determined in step 325 that the $d_t$ is less than or equal to an absolute value of the first threshold $d_p$ and the $S_t$ is less than the second threshold $d_{p\_reference}$, the BS receiver proceeds to step 333. In step 333, the BS receiver delays by a predetermined unit time, and then proceeds to step 335. Also, the reason for delaying by the predetermined unit time is to take into consideration the state transition delay. In step 335, the BS receiver increases the k by 1, i.e. transitions from the current point k to the next point k+1, and then returns to step 337. In step 337, the BS receiver determines if the communication is ended. If it is determined that the communication is ended, the BS receiver ends the ongoing procedure.

If it is determined in step 337 that the communication is not ended, the BS receiver proceeds to step 339. In step 339, the BS receiver calculates an error function $e_k$, and a difference between the reception signal $x_k$ and the desired reception signal $d_k$ according to the DD technique ($e_k=d_k$, $_{DD}-z_k$) because the BS receiver is currently in the stabilization step, and then proceeds to step 341. In step 341, the BS receiver calculates a differentiated value of a cost function using the despread signal $y_k$ and the error function $e_k$ ($\nabla J(w_k)=-2e^*_k y_k$), and then proceeds to step 343. In step 343, the BS receiver calculates a beam generation coefficient, or a weight ($w_k=w_{k-1}-\mu y_k e^*_k$), and then proceeds to step 345. In step 345, the BS receiver maintains the calculated weight $w_k$, and proceeds to step 333.

Figure 4:
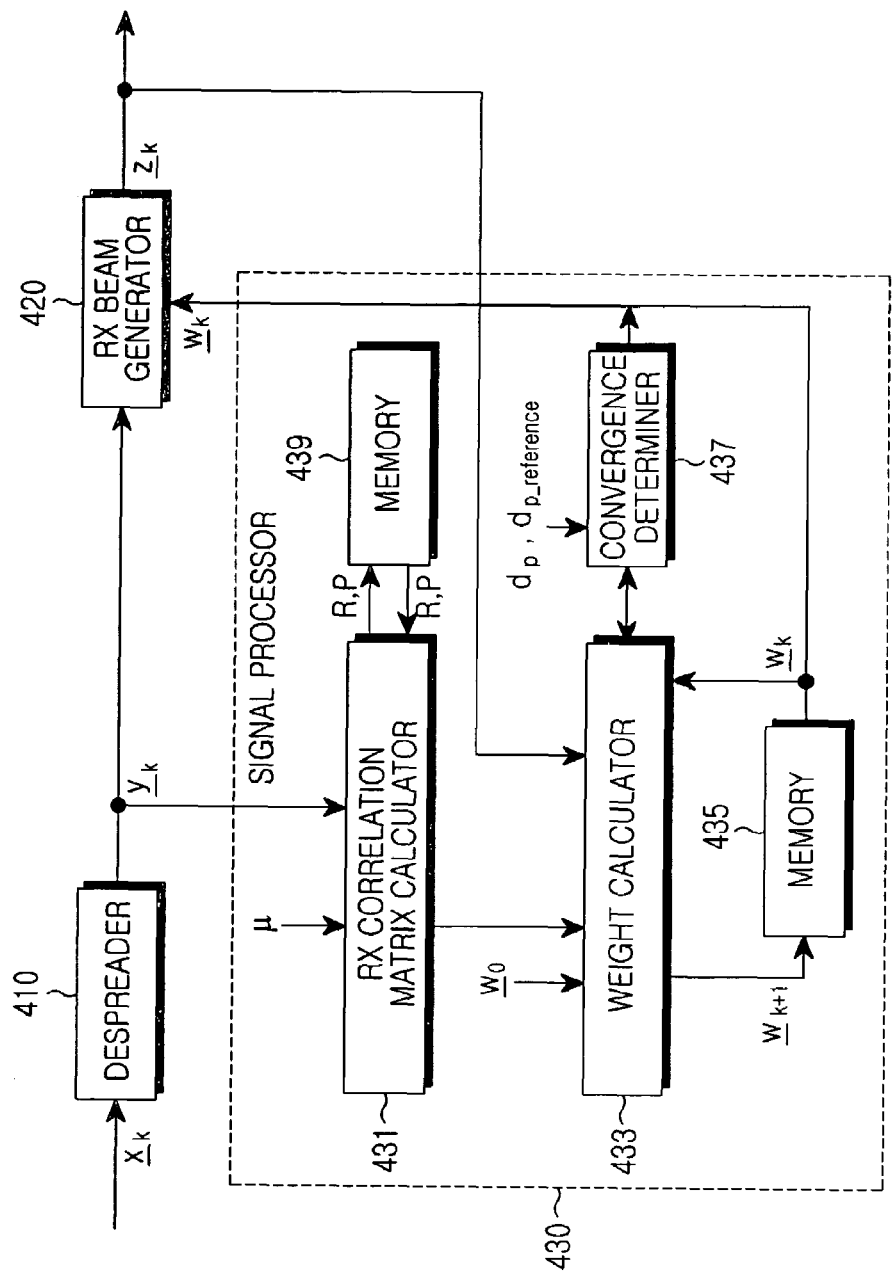
FIG. 4 is a block diagram illustrating a structure of a base station receiver according to a second embodiment of the present invention.

FIG. 4 is a block diagram illustrating a structure of a BS receiver according to a second embodiment of the present invention. While describing FIG. 4, it should be noted that a BS receiver according to the second embodiment of the present invention is similar in structure to the BS receiver described in connection with FIG. 1, but different in a method for determining a weight by a signal processor. For simplicity, only the elements directly related to the present invention in the BS receiver will be described with reference to FIG. 4. The second embodiment of the present invention corresponds to an embodiment where the MMSE technique is used.

Referring to FIG. 4, when a reception signal $x_k$ at a point k is received, a despreader 410 despreads the reception signal $x_k$ using a predetermined despreading code, and outputs the despread reception signal $y_k$ to a signal processor 430 and a reception beam generator 420. The signal processor 430 is comprised of a reception correlation matrix calculator 431, a weight calculator 433, a memory 435, a convergence determiner 437 and a memory 439. For simplicity, FIG. 4 will be described with reference to only the first finger 140-1 in the BS receiver of FIG. 1. Therefore, the despreader 410 of FIG. 4 is substantially identical in operation to the N despreaders of the first despreader 141 to the $N^{th}$ despreader 143 in the first finger 140-1. The reception correlation matrix calculator 431 of the reception processor 430 receives the despread reception signal $y_k$, calculates a reception correlation matrix using a predetermined constant gain $\mu$, and buffers the calculated reception correlation matrix in the memory 439. The memory 439 buffers the reception correlation matrix calculated by the reception correlation matrix calculator 431, and the reception correlation matrix calculator 431 uses the reception correlation matrix stored in the memory 439 when updating the reception correlation matrix buffered therein. The "correlation matrix" refers to the auto-correlation matrix R and the cross-correlation matrix P.

The weight calculator 433 calculates a weight $w_k$ by receiving the despread reception signal $y_k$, a predetermined constant gain $\mu$, an initial weight $w_0$, and a finger signal $z_k$ output from the reception beam generator 420, and outputs the calculated weight to the memory 435. The memory 435 buffers the weight $w_k$ calculated by the weight calculator 433, and the weight calculator 433 uses the weight $w_k$ stored in the memory 435 when updating the weight $w_k$. That is, the weight calculator 433 updates a weight $w_{k+1}$ at the next point k+1 using the $w_k$ calculated at the point k. Meanwhile, the weight calculator 433 calculates a weight under the control of the convergence determiner 437 in the method described in connection with the first embodiment of the present invention. That is, as described in the first embodiment, the convergence determiner 437 determines a technique in which the weight calculator 433 will calculate a weight $w_k$.

Figure 5:
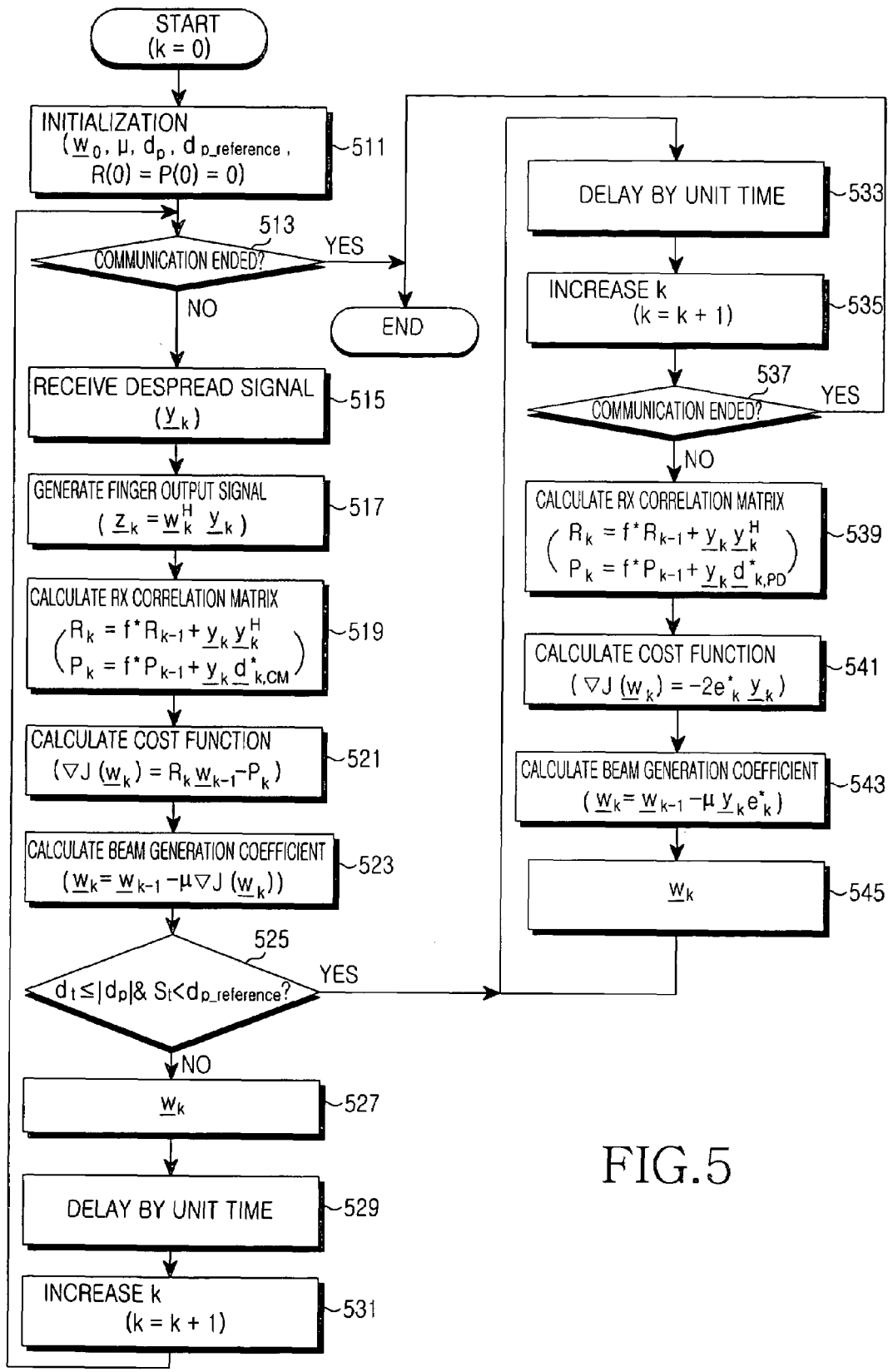
FIG. 5 is a flowchart illustrating a signal reception procedure by a base station receiver according to a second embodiment of the present invention.

FIG. 5 is a flowchart illustrating a signal reception procedure by a BS receiver according to a second embodiment of the present invention. Referring to FIG. 5, in step 511, a BS receiver sets up an initial weight $w_0$, a constant gain $\mu$, a first threshold $d_p$, and a second threshold $d_{p\_reference}$, and sets both an initial auto-correlation matrix $R(0)$ of a reception signal $x_k$ and an initial cross-correlation matrix $P(0)$ between the reception signal $x_k$ and a desired reception signal $d_k$, to '0', and then proceeds to step 513. In step 513, the BS receiver determines if the communication is ended. If it is determined that the communication is ended, the BS receiver ends the ongoing procedure.

If it is determined in step 513 that the communication is not ended, the BS receiver proceeds to step 515. In step 515, the BS receiver receives a despread signal $y_k$ for the reception signal $x_k$, and then proceeds to step 517. In step 517, the BS receiver calculates a set $z_k$ of signals $z_k$ output from respective fingers of the BS receiver using the despread signal $y_k$ and a weight $w_k$ ($z_k=w_k^H y_k$), and then proceeds to step 519. The $z_k$ represents a set of finger output signals generated using a reception beam. In step 519, the BS receiver calculates the reception correlation matrixes, i.e. auto-correlation matrix $R_k$ and a cross-correlation matrix $P_k$ according to the CM technique because the BS receiver is initially in the convergence step, and then proceeds to step 521. A process of calculating the auto-correlation matrix $R_k$ and the cross-correlation matrix $P_k$ is expressed as $$R_k = f^* R_{k-1} + y_k y_k^H$$

$$P_k = f^* P_{k-1} + y_k d^*_{kCM} \qquad (25)$$

In Equation (25), 'f' is a forgetting factor and denotes only a value of the immediately previous step.

In step 521, the BS receiver calculates a differentiated value of a cost function using the auto-correlation matrix $R_k$ and the cross-correlation matrix $P_k$ ($\nabla J(w_k)=R_k w_{k-1}-P_k$), and then proceeds to step 523. In step 523, the BS receiver calculates a beam generation coefficient, or a weight ($w_k = w_{k-1} - \mu \nabla J(w_k)$), and then proceeds to step 525. In step 525, the BS receiver determines if a difference $d_t$ between $S_t$ and $S_{t-1}$ satisfies a convergence condition, i.e. if the $d_t$ is less than or equal to an absolute value of the first threshold $d_p$ and the $S_t$ is less than the second threshold $d_{p\_reference}$ ($d_t \leq |d_p|$, $S_t < d_{p\_reference}$). If the $d_t$ is less than or equal to an absolute value of the first threshold $d_p$ and the $S_t$ is less than the second threshold $d_{p\_reference}$, i.e. if the $d_t$ is greater than an absolute value of the first threshold $d_p$ or the $S_t$ is greater than or equal to the second threshold $d_{p\_reference}$, the BS receiver proceeds to step 527. In step 527, the BS receiver maintains the calculated weight $w_k$, and proceeds to step 529. In step 529, the BS receiver delays by a predetermined unit of time, and then proceeds to step 531. The reason for delaying by the predetermined unit of time is to take into consideration a state transition delay. In step 531, the BS receiver increases the k by 1, i.e. transitions from the current point k to the next point k+1, and then returns to step 513.

However, if it is determined in step 525 that the $d_t$ is less than or equal to an absolute value of the first threshold $d_p$ and the $S_t$ is less than the second threshold $d_{p\_reference}$, the BS receiver proceeds to step 533. In step 533, the BS receiver delays by a predetermined unit of time, and the proceeds to step 535. Also, the reason for delaying by the predetermined unit of time is to take into consideration the state transition delay. In step 535, the BS receiver increases the k by 1, i.e. transitions from the current point k to the next point k+1, and then returns to step 537. In step 537, the BS receiver determines if the communication is ended. If it is determined that the communication is ended, the BS receiver ends the ongoing procedure.

If it is determined in step 537 that the communication is not ended, the BS receiver proceeds to step 539. In step 539, the BS receiver calculates the reception correlation matrixes, i.e. auto-correlation matrix $R_k$ and a cross-correlation matrix $P_k$ according to the DD technique because the BS receiver is currently in the stabilization step, and then proceeds to step 541. A process of calculating the auto-correlation matrix $R_k$ and the cross-correlation matrix $P_k$ is expressed as $$R_k = f^* R_{k-1} + y_k y_k^H$$

$$P_k = f^* P_{k-1} + y_k d^*_{kDD} \qquad (26)$$

In step 541, the BS receiver calculates a differentiated value of a cost function using the auto-correlation matrix $R_k$ and the cross-correlation matrix $P_k$ ($\nabla J(w_k)=R_k w_{k-1}-P_k$), and then proceeds to step 543. In step 543, the BS receiver calculates a beam generation coefficient, or a weight ($w_k = w_{k-1} - \mu \nabla J(w_k)$), and then proceeds to step 545. In step 545, the BS receiver maintains the calculated weight $w_k$, and proceeds to step 533.

Figure 9:
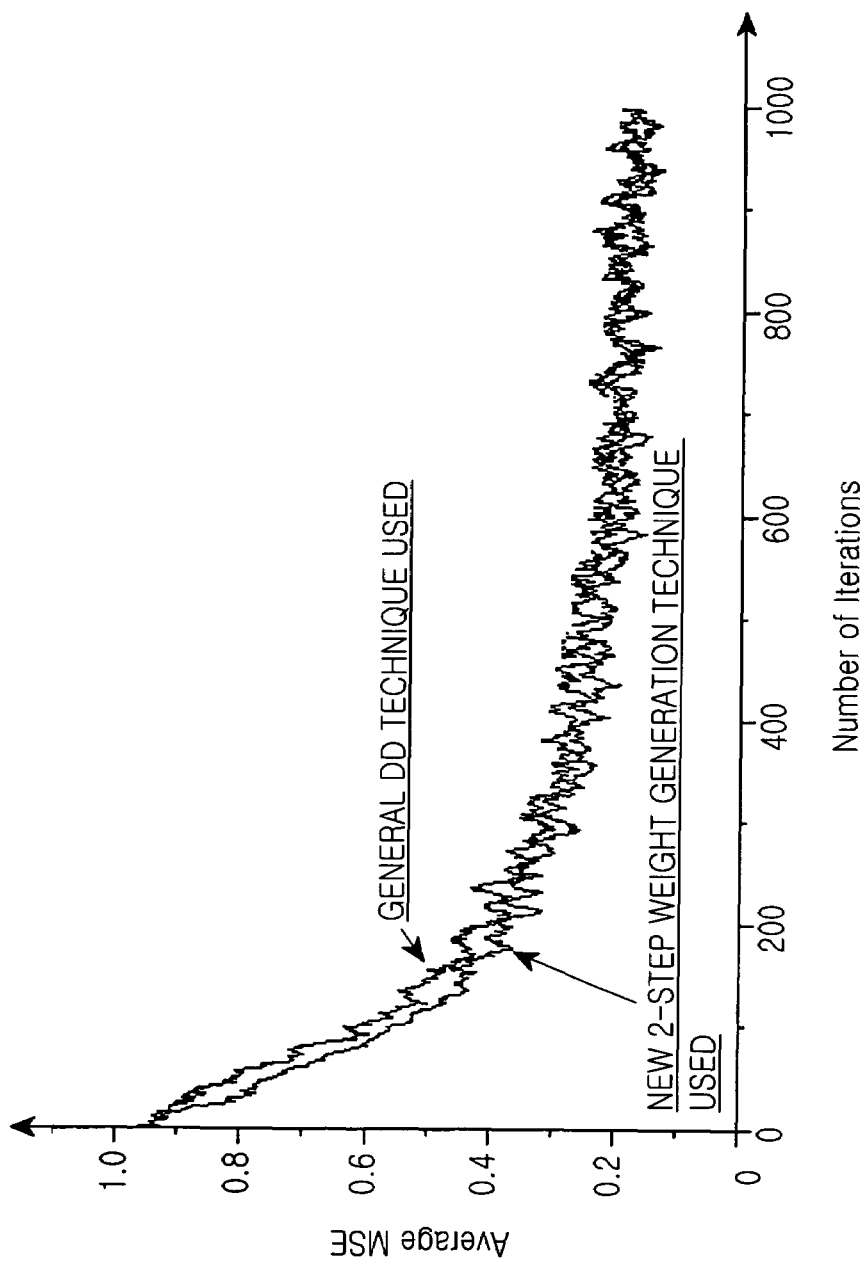
FIG. 9 is a graph illustrating a characteristic curve for a general weight generation technique and a 2-step weight generation technique according to an embodiment of the present invention.

With reference to FIG. 9, a description will now be made of a simulation result on a 2-step weight generation technique according to an embodiment of the present invention and a general weight generation technique.

FIG. 9 is a graph illustrating a characteristic curve for a general weight generation technique and a 2-step weight generation technique according to an embodiment of the present invention. Referring to FIG. 9, it is noted that an MSE value against the number of iterations for the 2-step weight generation technique according to the present invention is converged into a less value, compared with an MSE value against the number of iterations for the conventional weight generation technique, e.g., a DD technique. That the MSE value is converged into a less value means that a reception beam can be correctly generated, making it possible to correctly receive only a desired reception signal.

Figure 10:
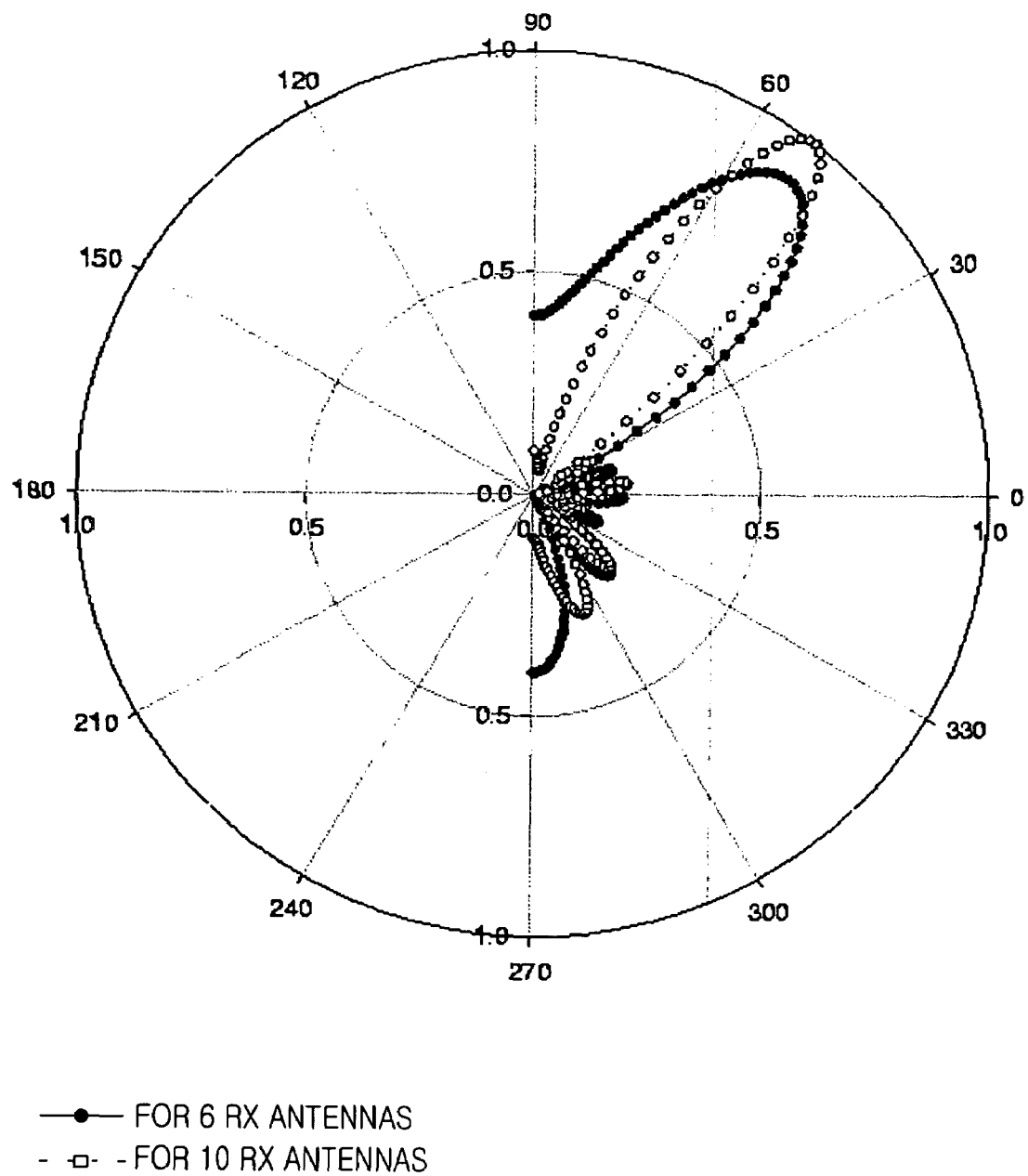
FIG. 10 is a graph illustrating a characteristic curve according to the number of reception antennas of a base station receiver for a 2-step weight generation technique according to the embodiments of the present invention.

With reference to FIG. 10, a description will now be made of a simulation result on a characteristic of a 2-step weight generation technique according to the number of reception antennas for which a smart antenna is used.

FIG. 10 is a graph illustrating a characteristic curve according to the number of reception antennas of a BS receiver for a 2-step weight generation technique according to the embodiments of the present invention. Referring to FIG. 10, there is illustrated a radiation pattern for a BS receiver having 6 reception antennas and a BS receiver having 10 reception antennas. For example, if it is assumed that a particular BS is located at 57°, it is noted that compared with the BS receiver having 6 reception antennas, the BS receiver having 10 reception antennas has a normalized antenna gain of about 0.2, and can more correctly generate a reception beam. In conclusion, in terms of capacity of an OFDM mobile communication system, an increase in the number of the reception antennas causes an increase in the amplitude of the reception signals enabling a correct communication, thereby contributing to an increase in system capacity.

Figure 11:
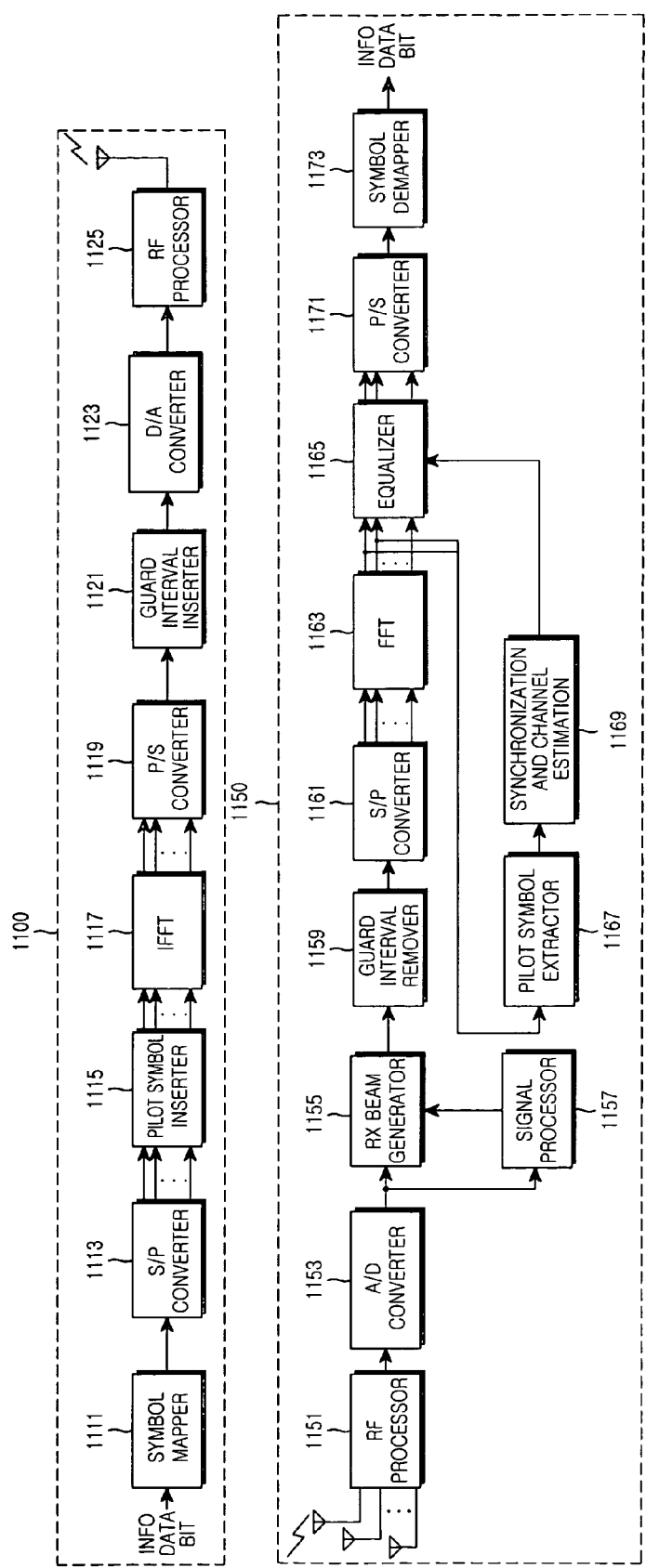
FIG. 11 is a block diagram illustrating a structure of an OFDM mobile communication system according to an embodiment of the present invention.

FIG. 11 is a block diagram illustrating a structure of an OFDM mobile communication system according to an embodiment of the present invention. Referring to FIG. 11, the OFDM communication system is comprised of a transmitter, or a MS transmitter 1100, and a receiver, or a BS receiver 1150.

First, the MS transmitter 1100 will be described. The MS transmitter 1100 is comprised of a symbol mapper 1111, a serial-to-parallel (S/P) converter 1113, a pilot pattern inserter 1115, an inverse fast Fourier transform (IFFT) block 1117, a parallel-to-serial (P/S) converter 1119, a guard interval inserter 1121, a digital-to-analog (D/A) converter 1123, and a radio frequency (RF) processor 1125.

When there are information data bits to be transmitted, the information data bits are input to the symbol mapper 1111. The symbol mapper 1111 modulates the input information data bits in a predetermined modulation scheme for symbol mapping, and outputs the symbol-mapped data bits to the serial-to-parallel converter 1113. Here, quadrature phase shift keying (QPSK) or 16-ary quadrature amplitude modulation (16 QAM) can be used as the modulation scheme. The serial-to-parallel converter 1113 parallel-converts serial modulation symbols output from the symbol mapper 1111, and outputs the parallel-converted modulation symbols to the pilot pattern inserter 1115. The pilot pattern inserter 1115 inserts pilot patterns in the parallel-converted modulation symbols output from the serial-to-parallel converter 1113, and then outputs the pilot pattern-inserted modulation symbols to the IFFT block 1117.

The IFFT block 1117 performs N-point IFFT on the signals output from the pilot pattern inserter 1115, and outputs the resultant signals to the parallel-to-serial converter 1119. The parallel-to-serial converter 1119 serial-converts the signals output form the IFFT block 1117, and outputs the serial-converted signals to the guard interval inserter 1121. The guard interval inserter 1121 receives the signal output from the parallel-to-serial converter 1119, inserts a guard interval therein, and outputs the guard interval-inserted signal to the digital-to-analog converter 1123. The guard interval is inserted to remove interference between a previous OFDM symbol transmitted at a previous OFDM symbol time and a current OFDM symbol to be transmitted at a current OFDM symbol time in an OFDM communication system. For the guard interval, a cyclic prefix method or a cyclic postfix method is used. In the cyclic prefix method, a predetermined number of last samples of an OFDM symbol in a time domain are copied and inserted into a valid OFDM symbol. In the cyclic postfix method, a predetermined number of first samples of an OFDM symbol in a time domain are copied and inserted into a valid OFDM symbol.

The digital-to-analog converter 1123 analog-converts the signal output from the guard interval inserter 1121, and outputs the analog-converted signal to the RF processor 1125. The RF processor 1125, including a filter and a front-end unit, RF-processes the signal output from the digital-to-analog converter 1123 such that the signal can be actually transmitted over the air, and transmits the RF-processed signal over the air via a transmission antenna.

Next, the BS receiver 1150 will be described. The BS receiver 1150 is comprised of an RF processor 1151, an analog-to-digital (A/D) converter 1153, a reception beam generator 1155, a signal processor 1157, a guard interval remover 1159, a serial-to-parallel (S/P) converter 1161, a fast Fourier transform (FFT) block 1163, an equalizer 1165, a pilot symbol extractor 1167, a synchronization & channel estimation unit 1169, a parallel-to-serial (P/S) converter 1171, and a symbol demapper 1173.

The signals transmitted by the MS transmitter 1100 are received via reception antennas of the BS receiver 1150, the received signal experiencing a multipath channel and having a noise component. The signals received via the reception antennas are input to the RF processor 1151, and the RF processor 1151 down-converts the signals received via the reception antennas into an intermediate frequency (IF) signal, and outputs the IF signal to the analog-to-digital converter 1153. The analog-to-digital converter 1153 digital-converts an analog signal output from the RF processor 1151, and outputs the digital-converted signal to the reception beam generator 1155 and the signal processor 1157. Operations of the reception beam generator 1155 and the signal processor 1157 have been described with reference to the first and second embodiments of the present invention, so a detailed description thereof will be omitted.

The signal output from the reception beam generator 1155 is input to the guard interval remover 1159. The guard interval remover 1159 removes a guard interval from the signal output from the reception beam generator 1155, and outputs the resultant signal to the serial-to-parallel converter 1161. The serial-to-parallel converter 1161 parallel-converts the serial signal output from the guard interval remover 1159, and outputs the resultant signal to the FFT block 1163. The FFT block 1163 performs N-point FFT on the signal output from the serial-to-parallel converter 1161, and outputs the resultant signal to the equalizer 1165 and the pilot symbol extractor 1167. The equalizer 1165 performs channel equalization on the signal output from the FFT block 1163, and outputs a resultant signal to the parallel-to-serial converter 1171. The parallel-to-serial converter 1171 serial-converts the parallel signal output from the equalizer 1165, and outputs a resultant signal to the symbol demapper 1173. The symbol demapper 1173 demodulates the signal output from the parallel-to-serial converter 1171 using a demodulation scheme corresponding to the modulation scheme used in the MS transmitter 1100, and outputs a resultant signal as received information data bits.

Further, the signal output from the FFT block 1163 is input to the pilot symbol extractor 1167, and the pilot symbol extractor 1167 extracts pilot symbols from the signal output from the FFT block 1163, and outputs the extracted pilot symbols to the synchronization & channel estimation unit 1169. The synchronization & channel estimation unit 1169 performs synchronization and channel estimation on the pilot symbols output from the pilot symbol extractor 1167, and outputs the result to the equalizer 1165.

As is understood from the foregoing description, the mobile communication system generates a weight using a 2-step weight generation technique, or a CM technique, in a convergence step, and generates a weight using a DD technique in a stabilization step, thereby making it possible to rapidly generate a weight with a minimum MSE value. Therefore, it is possible to generate a correct reception beam, and the correct reception of a reception beam allows a receiver to correctly receive only a desired signal, thereby improving system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method to generate a weight for generating a reception beam in a signal reception apparatus, the method comprising the steps of:
  calculating the weight for generating the reception beam based on a reception signal, an output signal generated by using the reception signal, the reception beam, and the weight, using one of a first technique and a second technique;
  performing a control operation such that the weight is calculated using the first technique if a difference between an error sum value at a current time and an error sum value at a previous time is greater than an absolute value of a first threshold or the error sum value at the current time is greater than or equal to a second threshold; and
  performing a control operation such that the weight is calculated using the second technique if the different between the error sum value at the current time and the error sum value at the previous time is less than or equal to the absolute value of the first threshold and the error sum value at the current time is less than the second threshold;
  wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or different from the third timing point.

2. The method of claim 1, wherein each error value is a value representative of a difference between a desired reception signal and the output signal, and is a mean square (MS) value.

3. The method of claim 1, wherein each error value is a value representative of a difference between a desired reception signal and the output signal, and is a mean square error (MSE) value.

4. The method of claim 1, wherein the first technique is a Constant Modulus (CM) technique and the second technique is a Decision-Directed (DD) technique.

5. A method to generate a weight for generating a reception beam in a signal reception apparatus, the method comprising the steps of:

generating a reception beam using the weight generated in one of a first technique and a second technique, and generating an output signal by using a reception signal and the generated reception beam;

calculating a cost function for minimizing an error value representative of a difference between a desired reception signal and the output signal;

performing a control operation such that the weight is calculated using the first technique if a difference between an error sum value at a current time and an error sum value at a previous time is greater than an absolute value of a first threshold or the error sum value at the current time is greater than or equal to a second threshold; and performing a control operation such that the weight is calculated using the second technique if the difference between the error sum value at the current time and the error value at the previous time is less than or equal to the absolute value of the first threshold and the error sum value at the current time is less than the second threshold;

wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or different from the third timing point.

6. The method of claim 5, wherein each error value is a mean square (MS) value.

7. The method of claim 5, wherein the first technique is a Constant Modulus (CM) technique and the second technique is a Decision-Directed (DD) technique.

8. A method to generate a weight for generating a reception beam in a signal reception apparatus, the method of comprising the steps of:

generating a reception beam using the weight generated in one of a first technique and a second technique, and generating an output signal by using a reception signal and the generated reception beam;

calculating reception correlation matrixes using a desired reception signal and the reception signal, and calculating a cost function for minimizing an error value representative of a difference between the output signal and the desired reception signal;

performing a control operation such that the weight is calculated using the first technique if a difference between an error sum value at a current time and an error sum value at a previous time is greater than an absolute value of a first threshold or the error sum value at the current time is greater than or equal to a second threshold; and performing a control operation such that the weight is calculated using the second technique if the difference between the error sum value at the current time and the error sum value at the previous time is less than or equal to the absolute value of the first threshold and the error sum value at the current time is less than the second threshold;

wherein the error sum value at a previous time is sum of error values during a time interval from a first timing point to a second timing point, the error sum value at the current time is a sum of error values during a time interval from a third timing point to a fourth timing point. and the second timing point is equal to the third timing point or different from the third timing point.

9. The method of claim 8, wherein each error value is a mean square error (MSE) value.

10. The method of claim 8, wherein the reception correlation matrixes include an auto-correlation matrix and a cross-correlation matrix.

11. The method of claim 8, where the first technique is a Constant Modulus (CM) technique and the second technique is a Decision-Directed (DD) technique.

12. An apparatus to generate a weight for generating a reception beam in a signal reception apparatus, the apparatus comprising:

a signal processor to receive a reception signal, an output signal generated by using the reception signal and the generated reception beam and the weight, calculate the weight using a first technique if a difference between an error sum value at a current time and an error sum value at a previous time is greater than an absolute value of a first threshold or the error sum value at the current time is greater than or equal to a second threshold, and calculate the weight using a second technique if the different between the error value at the current time and the error sum value at the previous time is less than or equal to the absolute value of the first threshold and the error sum value at the current time is less than the second threshold;

wherein the error sum value at a previous time is a sum of error values during a time interval from a first timing point to a second timing point, the error sum value at the current time is a sum of error values during a time interval from a third timing point to a fourth timing point. and the second timing point is equal to the third timing point or different from the third timing point.

13. The apparatus of claim 12, wherein each error value is a value representative of a difference between a desired reception signal and the output signal, and is a mean square (MS) value.

14. The apparatus of claim 12, wherein each error value is a value representative of a difference between a desired reception signal and the output signal, and is a mean square error (MSE) value.

15. The apparatus of claim 12, wherein the first technique is a Constant Modulus (CM) technique and the second technique is a Decision-Directed (DD) technique.

16. An apparatus to generate a weight for generating a reception beam in a signal reception apparatus, the apparatus comprising:

a weight calculator to receive a reception signal and calculate the weight using one of a first technique and a second technique;

a convergence determiner to allow the weight calculator to use the first technique if a difference between an error sum value at a current time and an error sum value at a previous time is greater than an absolute value of a first threshold or the error sum value at the current time is greater than or equal to a second threshold, and allowing the weight calculator to use the second technique if the difference between the error sum value at the current time and the error sum value at the previous time is less than or equal to the absolute value of the first threshold and the error sum value at the current time is less than the second threshold; and a reception beam generator to receive the reception signal, generate a reception beam using the calculated weight, and generate an output signal by using the reception signal and the reception beam;

wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or different from the third timing point.

17. The apparatus of claim 16, wherein each error value is a value representative of a difference between a desired reception signal and the output signal, and is a mean square (MS) value.

18. The apparatus of claim 16, wherein the first technique is a Constant Modulus (CM) technique and the second technique is a Decision-Directed (DD) technique.

19. An apparatus to generate a weight for generating a reception beam in a signal reception apparatus, the apparatus comprising:
  a reception correlation matrix calculator to calculate reception correlation matrixes using a desired reception signal and a reception signal;
  a weight calculator to receive the reception signal and calculate the weight using one of a first technique and a second technique;
  a convergence determiner to allow the weight calculator to use the first technique if a difference between an error sum value at a current time, representative of a difference between an output signal generated by using the reception signal, the reception beam, a desired reception signal, and an error sum value at a previous time is greater than an absolute value of a first threshold or the error sum value at the current time is greater than or equal to a second threshold, and allowing the weight calculator to use the second technique if the difference between the error sum value at the current time and the error sum value at the previous time is less than or equal to the absolute value of the first threshold and the error sum value at the current time is less than the second threshold; and
  a reception beam generator to receive the reception signal, generate a reception beam using the calculated weight, and generate an output signal by using the reception signal and the reception beam;
  wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or different from the third timing point.

20. The apparatus of claim 19, wherein an error value is a mean square error (MSE) value.

21. The apparatus of claim 19, wherein the reception correlation matrixes include an auto-correlation matrix and a cross-correlation matrix.

22. The apparatus of claim 19, where the first technique is a Constant Modulus (CM) technique and the second technique is a Decision-Directed (DD) technique.

23. An apparatus to generate a reception beam signal in a signal reception apparatus, the apparatus comprising:
  a reception beam generator to generate a reception beam signal by receiving a reception signal and a weight signal; and
  a signal processor for generating the reception beam signal using a first technique if a difference between an error sum value of a current weight signal generated according to a reception signal corresponding to the number of iterations at a current time and an error sum value of a previous weight signal generated according to a reception signal corresponding to the number of iterations at a previous time is greater than an absolute value of a first threshold, or if the error sum value of the current weight signal is greater than or equal to a second threshold, and generating the reception beam signal using a second technique if the difference between the error sum value of the current weight signal and the error sum value of the previous weight signal is less than or equal to the absolute value of the first threshold and the error sum value of the current weight signal is less than the second threshold;
  wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or different from the third timing point.

24. The apparatus of claim 23, wherein each error value is a mean square (MS) value.

25. The apparatus of claim 23, wherein each error value is a mean square error (MSE) value.

26. The apparatus of claim 23, wherein the first technique is a constant modulus (CM) technique and the second technique is a Decision-Directed (DD) technique.

27. A method to generate a reception beam signal in a signal reception apparatus, the method comprising the steps of:
  generating a reception beam signal using a reception signal and a weight signal; and
  generating the reception beam signal using a first technique if a difference between an error sum value of a current weight signal generated according to a reception signal corresponding to the number of iterations at a current time and an error sum value of a previous weight signal generated according to a reception signal corresponding to the number of iterations at a previous time is greater than an absolute value of a first threshold, or if the error sum value of the current weight signal is greater than or equal to a second threshold, and generating the reception beam signal using a second technique if the difference between the error sum value of the current weight signal and the error sum value of the previous weight signal is less than or equal to the absolute value of the first threshold and the error sum value of the current weight signal is less than the second threshold;
  wherein the error sum value at a previous time is a sum of error values during a time interval from a first timing point to a second timing point, the error sum value at the current time is a sum of error values during a time interval from a third timing point to a fourth timing point, and the second timing point is equal to the third timing point or different from the third timing point.

28. The method of claim 27, wherein each error value is a mean square (MS) value.

29. The method of claim 27, wherein each error value is a mean square error (MSE) value.

30. The method of claim 27, wherein the first technique is a constant modulus (CM) technique and the second technique is a Decision-Directed (DD) technique.

* * * * *